United States Patent
Barve et al.

(10) Patent No.: US 12,198,572 B1
(45) Date of Patent: Jan. 14, 2025

(54) APPARATUS AND A METHOD FOR THE GENERATION OF AN IMPEDANCE MODEL OF A BIOLOGICAL CHAMBER

(71) Applicant: Anumana, Inc., Cambridge, MA (US)

(72) Inventors: Rakesh Barve, Bengaluru (IN); Deepak Anand, Doddanekundi (IN); Animesh Agarwal, San Mateo, CA (US); Yogisha Heggadahalli Jayendra, Bengaluru (IN); Karthik K. Bharadwaj, Bengaluru (IN); Sughosh Indurkar, Bengaluru (IN); Rohit Jain, Danville, CA (US)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 18/784,042

(22) Filed: Jul. 25, 2024

(51) Int. Cl.
 *G09B 23/30* (2006.01)
(52) U.S. Cl.
 CPC .................. *G09B 23/303* (2013.01)
(58) Field of Classification Search
 CPC ........ G09B 23/28; G09B 23/30; A61B 5/367; A61B 5/0063; A61B 5/0536; A61B 2017/0053
 See application file for complete search history.

(56) References Cited

U.S. PATENT DOCUMENTS

| | | | |
|---|---|---|---|
| 5,471,982 A * | 12/1995 | Edwards | A61B 5/6858 600/374 |
| 6,430,426 B2 * | 8/2002 | Avitall | A61N 1/06 600/374 |
| 6,480,747 B2 * | 11/2002 | Schmidt | A61B 5/287 607/122 |
| 6,529,756 B1 * | 3/2003 | Phan | A61B 18/1492 606/49 |
| 6,623,434 B2 * | 9/2003 | Chesney | A61B 5/02007 600/481 |
| 7,291,146 B2 * | 11/2007 | Steinke | A61B 18/1492 606/41 |
| 8,977,334 B2 | 3/2015 | Greenspan et al. | |

(Continued)

OTHER PUBLICATIONS

Yuan Jiang et al; An Impedance-Based Catheter Positioning System for Cardiac Mapping and Navigation; IEEE Transactions on Biomedical Engineering, vol. 56, No. 8, Aug. 2009.

*Primary Examiner* — Kurt Fernstrom
(74) *Attorney, Agent, or Firm* — Caldwell Intellectual Property Law

(57) ABSTRACT

An apparatus for the generation of an impedance model of a biological chamber is disclosed. The apparatus includes a catheter assembly comprising a plurality of electrodes arranged into one or more constraint pairs. The apparatus includes a processor and a memory communicatively connected to the processor. The memory instructs the processor to receive tank data. The memory instructs the processor to generate a plurality of relative configurations of the plurality of electrodes as a function of the tank data using a compliant configuration generator. The memory instructs the processor to record voltage data from the plurality of electrodes within a biological chamber as a function of the plurality of relative configurations. The memory instructs the processor to map a plurality of impedance metrics for each relative configuration as a function of the voltage data. The memory instructs the processor to generate an impedance model as a function of the map.

20 Claims, 8 Drawing Sheets

(56) References Cited

U.S. PATENT DOCUMENTS

| | | | |
|---|---|---|---|
| 10,952,634 B2* | 3/2021 | Grychtol | G09B 23/30 |
| 11,213,235 B2* | 1/2022 | Osadchy | A61B 5/068 |
| 2008/0228060 A1* | 9/2008 | Tegg | A61B 5/287 |
| | | | 600/374 |
| 2009/0275828 A1 | 11/2009 | Shachar et al. | |
| 2013/0035576 A1* | 2/2013 | O'Grady | A61B 5/6853 |
| | | | 600/373 |
| 2015/0196214 A1 | 7/2015 | Shuros et al. | |
| 2015/0196215 A1 | 7/2015 | Laughner et al. | |

* cited by examiner

APPARATUS AND A METHOD FOR THE GENERATION OF AN IMPEDANCE MODEL OF A BIOLOGICAL CHAMBER

FIELD OF THE INVENTION

The present invention generally relates to the field of medical technology. In particular, the present invention is directed to an apparatus and a method for the generation of an impedance model of a biological chamber.

BACKGROUND

Accurately identifying and targeting specific tissue types within the body during medical procedures using catheter-based systems has long been a difficult and invasive process. The challenge lies in the precise localization and characterization of tissues, particularly in environments like the heart where tissue properties can vary significantly and are critical to the procedure's success.

SUMMARY OF THE DISCLOSURE

In an aspect, an apparatus for the generation of an impedance model of a biological chamber is disclosed. The apparatus include at least a catheter assembly comprising a plurality of electrodes arranged into one or more constraint pairs. The apparatus includes at least processor and a memory communicatively connected to the processor. The memory instructs the processor to receive tank data. The memory instructs the processor to generate a plurality of relative configurations of the plurality of electrodes as a function of the tank data using a compliant configuration generator. The memory instructs the processor to record voltage data from the plurality of electrodes within a biological chamber as a function of the plurality of relative configurations. The memory instructs the processor to map a plurality of impedance metrics for each relative configuration as a function of the voltage data. The memory instructs the processor to generate an impedance model as a function of the map.

In another aspect, a method for the generation of an impedance model of a biological chamber is disclosed. The method includes receiving, using at least a processor, tank data. The method includes generating, using the at least a processor, a plurality of relative configurations of a plurality of electrodes of at least a catheter assembly as a function of the tank data using a compliant configuration generator (CCG), wherein the at least a catheter assembly comprises at least a tip formed by a plurality of limbs, wherein each limb of the plurality of limbs comprises the plurality of electrodes arranged into one or more constraint pairs. The method includes recording, using the at least a processor, voltage data from the plurality of electrodes within a biological chamber as a function of the plurality of relative configurations. The method includes mapping, using the at least a processor, a plurality of impedance metrics for each relative configuration of the plurality of relative configurations as a function of the voltage data. The method includes generating, using the at least a processor an impedance model as a function of the map.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for the generation of an impedance model of a biological chamber. The apparatus include at least a catheter assembly comprising a plurality of electrodes arranged into one or more constraint pairs. The apparatus includes at least processor and a memory communicatively connected to the processor. The memory instructs the processor to receive tank data. The memory instructs the processor to generate a plurality of relative configurations of the plurality of electrodes as a function of the tank data using a compliant configuration generator. The memory instructs the processor to record voltage data from the plurality of electrodes within a biological chamber as a function of the plurality of relative configurations. The memory instructs the processor to map a plurality of impedance metrics for each relative configuration as a function of the voltage data. The memory instructs the processor to generate an impedance model as a function of the map. Exemplary embodiments illustrating aspects of the present disclosure are described below in the context of several specific examples.

Figure 1:
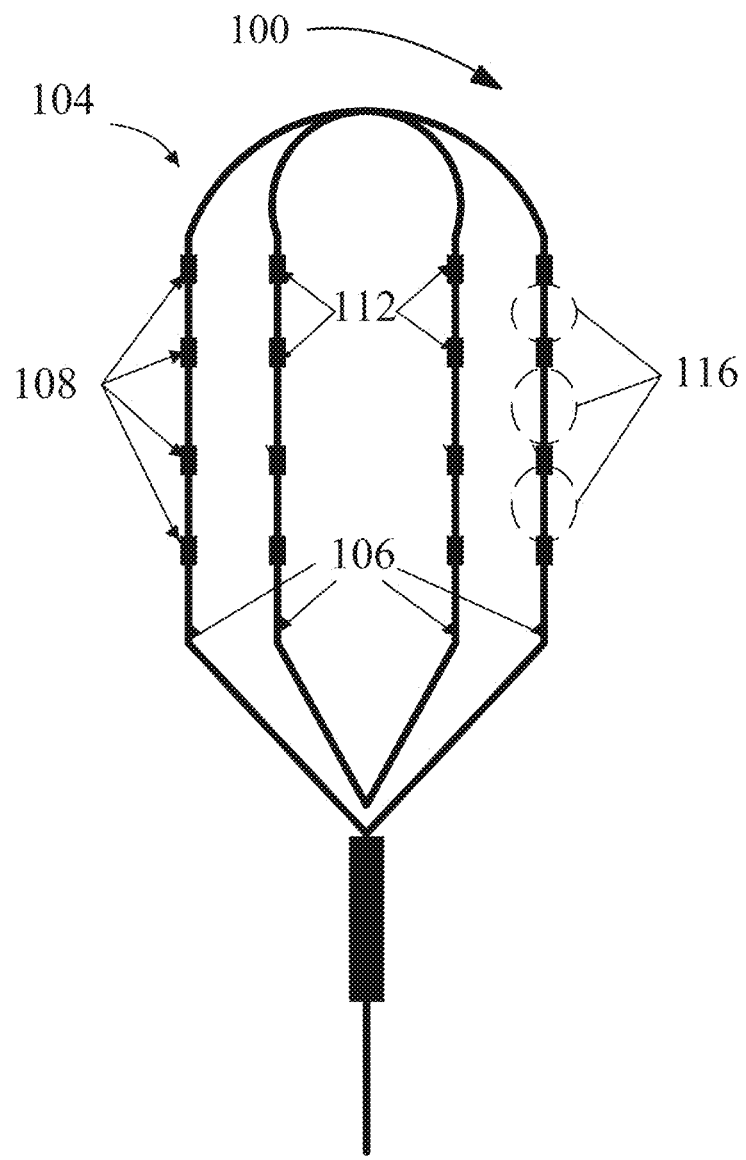
FIG. 1 are illustrations of an exemplary embodiment of a catheter assembly.

Referring now to FIG. 1, illustrations of an exemplary embodiment of a catheter assembly 100 is disclosed. As used in the current disclosure, a "catheter" is a flexible, tube-like medical device used to perform various diagnostic and therapeutic procedures within the body. A catheter assembly 100 may be made from medical-grade materials such as silicone, rubber, or polyurethane, allowing it to navigate through the vascular system, urinary tract, or other body cavities. Catheter assemblies 100 may vary in size, length, and tip configuration, tailored to specific medical applications, such as delivering medications, draining fluids, or performing complex surgical tasks like cardiac ablation and mapping. In cardiology, catheter assemblies 100 may be used for procedures such as angiography, where they inject contrast dye into the heart vessels for imaging, or for electrophysiology studies and interventions that involve mapping electrical activity and ablating faulty electrical pathways in the heart. Their design often includes features like radio-opaque materials, which make them visible under X-ray guidance during procedures, enhancing safety and precision. In an embodiment, a catheter assembly 100 may include a plurality of components. These components may include but are not limited to an ablation tool, catheter tip, catheter shaft, hub, guidewire, guidewire lumen, markers, control mechanisms, coatings, and the like.

With continued reference to FIG. 1, a catheter assembly 100 may include a tip 104. As used in the current disclosure, a "catheter tip" is the distal end of the catheter. A catheter tip 104 may be designed to interact directly with body tissues or systems during medical procedures. Tips 104 may vary significantly in structure and functionality depending on its specific medical application. For example, in cardiac catheterization, the tip may be engineered to conduct electrical signals for diagnostic measurements or to deliver energy for ablation therapy. In contrast, tips used in intravenous catheters are optimized for smooth insertion and minimal discomfort, often featuring a tapered or beveled design. Catheter tips can also include specialized features such as ultrasound transducers for imaging, balloons for dilating vessels or valves, or baskets for retrieving stones or debris from bodily organs. Additionally, many catheter tips 104 may include sensors that provide real-time feedback on physiological parameters or the precise positioning of the tip within the body. The design of the catheter tip is important to the success of the procedure, influencing factors such as ease of navigation through the body's pathways, the effectiveness of the treatment delivered, and the overall safety of the procedure.

With continued reference to FIG. 1, a catheter assembly 100 includes a plurality of limbs 106. As used in the current disclosure, a "limb" refers to a specific branch or section that extends from the main body of the catheter. Each limb may be designed for a particular function, facilitating the performance of various tasks or delivery of therapies specific to the catheter's use. A limb 206 may be a structural subdivision or extension of a catheter that provides additional functionality beyond the main channel. These limbs are typically used for delivering medications, monitoring physiological parameters, facilitating the insertion of instruments or tools, or any other specialized task required by the medical procedure. Limbs can vary in number, size, and functionality depending on the type of catheter and its intended use. In an embodiment, catheter assembly 100 may include between 2 and 10 limbs.

With continued reference to FIG. 1, each limb 106 may serve as a structural supports for the electrodes 108 but also play a crucial role in their actuation. Actuation in this may refer to the ability to control the activation, operation, and positioning of the electrodes. The actuation process begins with the limbs 106, which may be engineered to include built-in mechanisms for controlling the electrodes. These mechanisms can range from simple mechanical designs that allow electrodes 108 to extend or retract based on manual adjustments to more sophisticated electronic systems that provide precise control over each electrode's electrical output. Moreover, the limbs 106 may contain embedded wiring and connectivity solutions that link the electrodes to external control systems. These systems may be a part of the catheter's interface and allow medical personnel to adjust the electrodes' settings in real-time. Adjustments can include changing the intensity, frequency, or pattern of the electrical impulses emitted by the electrodes, depending on the procedure's requirements.

With continued reference to FIG. 1, a catheter assembly 100 includes a plurality of electrodes 108 on each limb 106. As used in the current disclosure, an "electrodes" is a multi-functional component that is used for both diagnostic and therapeutic functions in medical procedures. Located on each limb 106 of the catheter, each electrode 108 may be engineered to perform functions essential for the successful execution of catheter-based interventions. The electrodes 108 may include conductive components used for therapy, such as delivering targeted treatments like ablation within the body, but they also serve diagnostic purposes. This dual functionality is integral to procedures like cardiac ablation, where precise location and treatment of aberrant electrical pathways are crucial. The therapeutic aspect typically involves the application of energy-be it radiofrequency, cryogenic, or others-to modify or destroy tissue responsible for abnormal activity, effectively treating conditions such as arrhythmias. In an embodiment, each electrode 108 may include a biomedical sensor. This biomedical sensor may enable real-time physiological monitoring. These sensors can measure various bioelectrical or biochemical parameters, providing continuous feedback on the local environment at the tip of the catheter. For instance, in cardiac applications, these sensors might record electrical signals from the heart tissue, aiding in the detailed mapping of electrical activity. This mapping is crucial for identifying precise treatment sites and for monitoring the effects of therapy, ensuring both the efficacy and safety of the procedure.

With continued reference to FIG. 1, each electrode 108 may include a biomedical sensor. As used in the current disclosure, a "biomedical sensor" is a specialized component that enhances the functionality of the electrode by enabling it to perform detailed physiological measurements directly from the site of interest within the body. The biomedical sensor embedded within electrode 108 is designed to detect and measure specific physiological parameters. These might include electrical activity, such as the heart's electrocardiographic signals in cardiac procedures, temperature changes, pH levels, or other biochemical markers that are used in assessing the health and condition of tissues. In the case of cardiac applications, such sensors are crucial for accurately mapping electrical pathways and identifying arrhythmic zones. The inclusion of a biomedical sensor in the electrode 108 may enable real-time, site-specific data collection. This capability allows for immediate feedback during procedures, aiding physicians in making informed decisions based on the latest physiological data. For instance, during a cardiac ablation procedure, sensors can measure the electrical activity before, during, and after ablation, providing essential information on the effectiveness of the treatment and the stability of the tissue post-ablation. The integration of the sensor with the electrode may ensure that the electrode delivers therapeutic treatments like ablation, while simultaneously gathering vital diagnostic data. This integration facilitates a comprehensive approach to treatment, where therapy is continuously guided and adjusted based on direct feedback from the target site.

With continued reference to FIG. 1, the biomedical sensor may be configured to measure the impedance within the heart. Measuring impedance within the heart may provide data that can help identify arrhythmic areas and guide therapeutic interventions such as ablation. Impedance measurement may refer to evaluating the resistance and reactance of heart tissue to an electrical current. By applying a small, known current through the electrodes and measuring the resulting voltage drop, the impedance can be calculated. This measurement may provide insight into the composition and health of the tissue, as different types of tissue (healthy, diseased, scarred) have distinct impedance characteristics. The biomedical sensor integrated into electrode 108 may include built-in impedance measurement capabilities. This may be used to perform real-time monitoring during procedures. These sensors may be designed to be highly sensitive and can differentiate between various types of cardiac tissue based on their electrical properties. In a non-limiting example, healthy myocardial tissue may reflect different impedance profile compared to scarred or fibrotic tissue, which might be targeted during ablation for arrhythmia treatment. Additionally, blood and fluid-filled areas may also display unique impedance characteristics, which can help in avoiding or targeting specific zones during interventions. During cardiac mapping procedures, impedance measurements help create a detailed map of the heart's electrical activity and tissue health. This map is crucial for identifying the pathways that cause arrhythmias. During ablation, continuous impedance monitoring can inform the physician about the extent of tissue modification. Changes in impedance can indicate effective ablation, helping to prevent overtreatment or undertreatment. Post-ablation, impedance measurements can help assess whether the targeted tissue has been adequately modified or needs further intervention.

With continued reference to FIG. 1, the plurality of electrodes 108 on the tip 104 of the catheter assembly 100 may be used as an ablation tool 112. As used in the current disclosure, an "ablation tool" is a medical device designed for precise, targeted therapeutic interventions within the body, particularly in treating cardiac arrhythmias such as atrial fibrillation. This tool may incorporate multiple electrodes 108 on the catheter's tip 104. Each electrode 108 may be capable of delivering energy to specific areas of tissue to modify or destroy it selectively. In an embodiment, each electrode 108 in the plurality can be individually controlled to emit specific types and amounts of energy, such as radiofrequency, cryoenergy, or laser, allowing for versatile treatment strategies. The ability to control each electrode independently helps in tailoring the ablation precisely to the size, shape, and location of the target tissue, enhancing the efficacy of the procedure while minimizing damage to surrounding healthy tissues.

With continued reference to FIG. 1, an ablation tool 112 composed of a plurality of electrodes may be used to treat cardiac arrhythmias such as atrial fibrillation. This tool may incorporate multiple electrodes 108 at its tip, each capable of delivering energy to specific areas of tissue to modify or destroy it selectively. The electrodes may be arranged at the distal end of the catheter assembly 100. The electrodes 108 may be arranged in a circular, linear, or array format depending on the specific medical requirement. These electrodes 108 may be made from conductive materials such as platinum or gold, which are chosen for their durability, conductivity, and biocompatibility. The arrangement of the electrodes is crucial as it allows for the delivery of ablation energy in a controlled and focused manner. In an embodiment, each electrode 108 within the plurality can be individually controlled to emit specific types and amounts of energy, such as radiofrequency, cryoenergy, or laser, allowing for versatile treatment strategies. The ability to control each electrode independently may allow for precision ablation tailored to the size, shape, and location of the target tissue, enhancing the efficacy of the procedure while minimizing damage to surrounding healthy tissues.

With continued reference to FIG. 1, the arrangement of electrodes 108 on catheter assembly 100 may play a role in delivering targeted therapeutic interventions and collecting detailed diagnostic data. Electrodes can be arranged in various configurations to suit specific medical requirements, enhancing the precision and effectiveness of the catheter. Electrodes 108 on a catheter assembly 100 can be arranged in several patterns, including linear, circular, rows, or in a grid. Each arrangement may be designed to maximize the catheter's ability to interact with the tissue it targets, depending on the procedure's needs. The plurality of electrodes 108 may be arranged in a grid arrangement. As used in the current disclosure, a "grid arrangement" is an arrangement of electrodes 108 in rows and columns. A grid arrangement may include a plurality of rows and columns each containing multiple electrodes 108. In a non-limiting example, a grid arrangement of the plurality of electrodes could be in three rows of four electrodes 108. This specific configuration may allow for a broad and yet precise area of coverage, making it ideal for procedures that require a nuanced approach to tissue interaction, such as cardiac ablation. By arranging the electrodes in multiple rows, the catheter can cover a larger surface area while maintaining the ability to target specific tissue sections accurately. This is particularly useful in cardiology, where large areas of the heart may need to be mapped and treated for arrhythmias. The configuration of the plurality of electrodes 108 may allow detailed electrical mapping of the heart's activity. The grid arrangement may enable the catheter to collect data from multiple points simultaneously, providing a comprehensive map of electrical signals across different layers and sections of heart tissue. In therapeutic applications, such as ablation, a grid arrangement may allow for segmented or selective energy delivery. For instance, only one or two rows of electrodes might be activated at a time, depending on the specific area requiring ablation. This capability ensures that the ablation is confined to the intended tissue, minimizing the impact on adjacent areas.

With continued reference to FIG. 1, the arrangement of electrodes 108 on each limb 106 includes a plurality of constraint pairs 116. As used in the current disclosure, "constraint pairs" refer to predefined relationships between pairs of electrodes that must remain constant or within certain limits during the use of the catheter. These pairs 116 may ensure that the catheter's configuration adheres to specific design and functional requirements, especially during complex medical procedures such as cardiac mapping or ablation. Constraint pairs 116 may be used to define the fixed or controlled distances and orientations between specific electrodes on a catheter. Constraint pairs 116 may include a rigid position of the limb 106 that separates each electrode 108 of the plurality of electrodes. These constraint pairs 116 may be used to maintain the structural integrity and functional capability of the catheter as it navigates through the body. Constraint pairs 116 may ensure that the catheter operates within its designed specifications. This compliance is vital for device certification and regulatory approval, as well as for ensuring that the device performs as tested during clinical trials. In medical applications, maintaining these constraints ensures that the catheter can perform its intended functions accurately. Constraint pairs 116 may help maintain the physical stability of the catheter by ensuring that the electrodes do not move into configurations that could be physically impossible or harmful to the patient. For example, they prevent electrodes from collapsing into each other or stretching too far apart, which could compromise the catheter's effectiveness or cause damage to body tissues. In procedures that rely on the precise application of energy (such as ablation) or the accurate measurement of electrical signals (such as impedance mapping), constraint pairs ensure that the spatial relationships necessary for accurate readings and energy delivery are maintained. This accuracy is crucial for the efficacy of the treatment and the safety of the procedure. In a non-limiting example, suppose a catheter has multiple electrodes arranged along its length intended for cardiac ablation. The constraint pairs 116 may specify that certain electrodes 108 must remain within a specific distance from each other to ensure optimal energy delivery to the heart tissue. If the catheter is designed to create a circular lesion, the constraint pairs might specify the angles and distances necessary to form a perfect circle, ensuring that all parts of the targeted area receive equal treatment.

Figure 2:
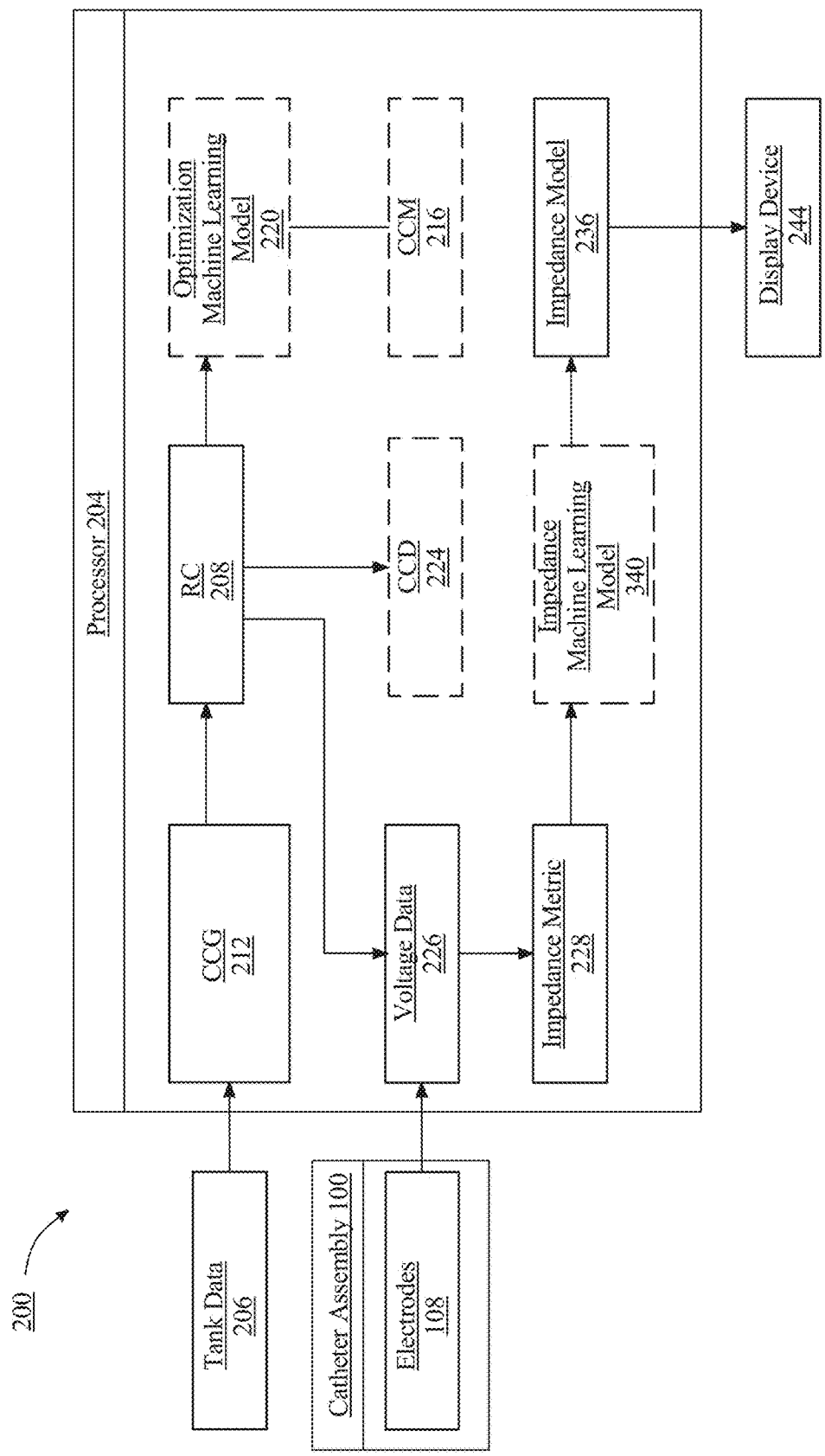
FIG. 2 is a block diagram of an exemplary embodiment of an apparatus for the generation of an impedance model of a biological chamber.

Referring now to FIG. 2, an exemplary embodiment of an apparatus 200 for the generation of an impedance model of a biological chamber is illustrated. Apparatus 200 includes a processor 204. Processor 204 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 204 may include a single computing device operating independently, or may include two or more computing device operating in concert, in parallel, sequentially or the like; two or more computing devices may be included together in a single computing device or in two or more computing devices. Processor 204 may interface or communicate with one or more additional devices as described below in further detail via a network interface device. Network interface device may be utilized for connecting processor 204 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 204 may include but is not limited to, for example, a computing device or cluster of computing devices in a first location and a second computing device or cluster of computing devices in a second location. Processor 204 may include one or more computing devices dedicated to data storage, security, distribution of traffic for load balancing, and the like. Processor 204 may distribute one or more computing tasks as described below across a plurality of computing devices of computing device, which may operate in parallel, in series, redundantly, or in any other manner used for distribution of tasks or memory between computing devices. Processor 204 may be implemented using a "shared nothing" architecture in which data is cached at the worker, in an embodiment, this may enable scalability of apparatus 200 and/or computing device.

With continued reference to FIG. 2, processor 204 may be designed and/or configured to perform any method, method step, or sequence of method steps in any embodiment described in this disclosure, in any order and with any degree of repetition. For instance, processor 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 204 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 2, apparatus 200 includes a memory. Memory is communicatively connected to processor 204. Memory may contain instructions configuring processor 204 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 2, processor 204 is configured to receive tank data 206. As used in the current disclosure, "tank data" refers to the measurements and information collected from experiments or procedures conducted in a controlled environment known as a tank. In the context of biomedical research and development, especially involving catheters and impedance measurements, a "tank" often denotes a specifically designed container filled with a conductive solution, such as a saline solution, which simulates the electrical properties of human tissues. Tank data 206 may consist of the various measurements recorded during the simulation of medical procedures in a saline tank. In an embodiment, tank data 206 may be used as training data for the operating systems of medical devices such as catheter assembly 100. The tank data may be data that was generated under controlled conditions that mimic the human body's electrical environment.

With continued reference to FIG. 2, tank data 206 may refer to the critical measurements and observations collected during experiments conducted in a saline tank designed to mimic the electrical properties of human tissues. This controlled environment may be used to refine the behavior of catheters under various RCs 208. Tank data 206 may include detailed records of electrical impedance, voltage measurements, and the precise positional data of the electrodes as they are manipulated within the tank. In an embodiment, the tank data 206 may include simulations and evaluations of different RCs of the catheter, assessing how each configuration interacts with an environment that approximates human tissue conductivity. For instance, by altering the arrangement of electrodes and observing the resulting changes in electrical properties, processor 204 may gather insights into how each RC would perform in actual clinical scenarios. This data may be used to optimize the catheter's design, constraints, configurations and the like, to ensure that the electrodes are positioned in such a way that maximizes efficacy and safety when used in medical procedures.

With continued reference to FIG. 2, processor 204 may be the central hub for receiving and processing all electrical measurements from the catheter's electrodes deployed within the saline tank. As the catheter maneuvers through the solution, simulating interaction with human tissues, the electrodes collect voltage, current, and impedance data, reflecting the interaction between the electrical components and the conductive medium. This data may be transmitted in real-time or at specified intervals from the catheter's sensors to processor 204 via a wired or wireless connection. Upon receiving this data, processor 204 may process and analyze the information. It may use pre-programmed algorithms to filter, normalize, and analyze the data, extracting meaningful patterns and metrics that are essential for evaluating the performance of different catheter configurations. This computational analysis is crucial for assessing how changes in electrode arrangement impact the device's effectiveness and for refining impedance models that predict tissue characteristics. Processor 204 might also store this data in an organized format for further analysis or use in machine learning models, aiding in the continuous improvement and development of catheter technologies. This streamlined flow of information ensures that the data gathered from tank experiments contributes effectively to the advancement of medical device precision and reliability.

With continued reference to FIG. 2, tank data 206 may be generated through computational models rather than collected from physical experiments in a saline tank. This approach may involve creating a virtual environment that simulates the electrical properties of human tissues and the interactions of a catheter with multiple electrodes in various relative configurations (RCs). Synthetic tank data may be useful in scenarios where physical testing is impractical, expensive, or requires rapid iteration of designs and configurations. The generation of synthetic tank data may employ simulation software that models the conductivity, impedance, and other relevant electrical characteristics of body tissues. The software may allow for the adjustment of variables such as electrode spacing, material properties, and even the saline solution's ionic composition, which are all factors that can influence the measurements in a real tank setup. By manipulating these parameters, processor 204 may explore a wide range of scenarios and gather extensive data on how different catheter configurations might perform under various conditions. Synthetic tank data may allow for rapid prototyping and testing without the need for extensive physical setups but also provides a controlled environment to test the impact of extreme conditions not easily replicable in a lab. Moreover, synthetic tank data can be used to train machine learning models that predict the behavior of catheter systems, enhancing the device's adaptability and performance in real clinical settings. Using synthetic data, developers can refine their impedance models and optimize catheter designs to ensure they are both effective and safe when finally used in medical procedures, thereby bridging the gap between theoretical modeling and practical application.

With continued reference to FIG. 2, the processor 204 is configured to generate a plurality of relative configurations 208 of the plurality of electrodes 108 as a function of the tank data 206. As used in the current disclosure, a "relative configuration" refers to the specific spatial arrangement of the electrodes relative to each other at a given time. Each Relative configuration 208 of catheter assembly 100 may describe how each electrode 108 on a device is positioned in relation to the others. This may not necessarily refer to the absolute positions of the electrodes 108 in space (which would be their locations in the body), but rather their positions relative to one another on the device itself. These configurations can change as the device is manipulated during a procedure. A relative configuration 208 may allow for medical devices to adapt to different anatomical structures and procedural needs. For example, a catheter might need to change its configuration to navigate through the tortuous pathways of the vascular system or to reach and effectively treat a specific area within the heart. In procedures that require the delivery of energy, such as in ablation therapy, the relative configuration 208 of electrodes may affect the shape and size of the energy field created. Proper configuration may ensure that the energy is delivered precisely where it is needed and in the correct amount. For diagnostic procedures, such as electrical impedance mapping, the relative configuration of electrodes can significantly impact the accuracy of the measurements. Electrodes need to be positioned correctly relative to each other to ensure that the electrical signals are measured accurately, which is used for diagnosing conditions like arrhythmias. In a non-limiting example, consider a catheter used for cardiac ablation, which might have electrodes that need to be arranged in a specific pattern to create a lesion of a particular shape. A relative configuration 208 could be a linear arrangement for creating a line of ablation or a circular arrangement for encircling a pulmonary vein. During the procedure, the catheter might be designed to adjust these configurations dynamically, moving from a linear to a circular arrangement as it reaches the treatment site, adapting to the heart's anatomy and the specific treatment requirements.

With continued reference to FIG. 2, RCs 208 may be generated as a function of tank data by harnessing and optimizing electrode arrangements. Initially, a baseline set of RCs may be established based on theoretical models and previous experimental data, which is then tested in a saline tank that simulates the electrical properties of human tissues.

This baseline set of RC's 208 may be generated as a function of the tank data 206. In an embodiment, as catheter assembly 100 is manipulated within the tank, precise measurements of electrical impedance, voltage, and current are recorded for each configuration. This tank data 206 may provide provides empirical evidence on how different configurations interact with a medium similar to human tissue. Processor 204 may process this data by analyzing patterns and discrepancies between expected and actual results. This may be done using algorithms or machine learning. The processor may then evaluate the efficacy of each configuration in real-time, identifying which configurations yield the most accurate or desirable outcomes. Based on this analysis, the processor 204 may dynamically adjust the RCs 208, refining the electrode placements and orientations to better align with the operational goals, such as enhanced imaging clarity or more effective tissue ablation.

With continued reference to FIG. 2, processor 204 may be configured to map all possible relative configurations 208 of the plurality of electrodes 108. Mapping every possible relative configuration of electrodes on a catheter using a processor 204 may involve tracking a combination of hardware capabilities, software algorithms, and specific procedural inputs, and constraints. Processor 204 may manage and control the catheter's RC 208 dynamically during medical procedures, ensuring that they are optimally positioned for diagnosis or treatment. The processor may map the possible RCs 208 as a function of the constraint pairs 116 and any other constraints. The processor must understand the physical and operational constraints of the catheter's design. This includes knowing the maximum and minimum distances and angles between electrodes, as well as any mechanical limitations of the catheter, such as flexibility and torsional strength. This data forms the basis for understanding which configurations are physically possible and safe for operation within the body.

With continued reference to FIG. 2, processor 204 may manage RCs 208 for optimal performance. This involves an intricate process where every potential relative configuration of the electrodes is mapped and adjusted in real-time, guided by a set of predefined constraints known as constraint pairs 116. The processor 204 utilizes advanced algorithms (i.e. compliant configuration generator 212) to calculate and recalibrate the spatial arrangement of electrodes along the catheter tip. This calculation may be based on the constraint pairs 116, which define specific relational parameters that must be maintained between pairs of electrodes. These parameters could include fixed distances or angles, ensuring that while the catheter flexes or moves, the relationships between electrodes needed for effective operation are preserved. Constraint pairs 116 may serve as a safety and functionality check, preventing configurations that could lead to ineffective treatment or potential harm to the patient. In an embodiment, processor 204 may employ dynamic simulation tools that incorporate real-time feedback from the catheter's sensors, including impedance sensors, pressure gauges, and possibly optical sensors, to understand the catheter's interaction with the body's internal structures. These simulations help predict how changes in electrode configurations might affect the procedure outcome. For example, in an ablation procedure, the processor adjusts the electrodes to ensure that the energy delivered is adequately distributed across the necessary tissue areas while avoiding sensitive structures.

With continued reference to FIG. 2, mapping all possible Relative Configurations (RCs) 208 of a catheter assembly 100 can be done by generating a virtual model to map every possible configuration. Processor 204 may generate a virtual model of the catheter assembly 100 and using simulation software to explore every possible RC 208 within the constraints defined by the device's design, such as the constraint pairs 116. This process may employ dynamic modeling techniques to generate a comprehensive map of potential RCs 208. The advantage of this approach may lie in its efficiency and safety, as it allows for extensive testing without the need for physical prototypes or risking patient safety. Virtual mapping the RC's can facilitate rapid mapping of configurations, adjusting parameters and instantly seeing the results. This method may be particularly useful in the design and testing phases of catheter development, where different configurations can be evaluated for their effectiveness in procedures such as ablation or mapping without the actual physical deployment of the device.

With continued reference to FIG. 2, the virtual modeling approach for mapping all possible relative configurations (RCs) 208 of a catheter's electrodes may represent of method in optimizing of medical devices. By utilizing computational simulations, this model may enable designers and engineers to create a detailed and dynamic representation of the catheter within a virtual environment. This virtual environment can simulate a variety of physiological conditions and interactions that the catheter might encounter during actual medical procedures. The core of this virtual modeling may include the application of algorithms that can replicate the physical properties of the catheter and the biological tissues it interacts with. In an embodiment, a compliant configuration generator 212 or another algorithm may input different parameters such as the flexibility of the catheter, the electrical properties of the electrodes, and the biomechanical characteristics of human tissue to see how the catheter would behave under various conditions. This may allow for the exploration of countless electrode configurations without the risks and costs associated with physical prototypes. Moreover, virtual models may be integrated with data from real-world clinical scenarios or previous simulations to enhance their accuracy and predictive capabilities. For example, machine learning techniques can be employed to refine the model based on outcomes from past simulations, creating predictive models that can anticipate how changes in electrode configurations might affect procedure outcomes. In an embodiment, virtual modeling may also offer an invaluable tool for training medical professionals. It provides a risk-free platform for doctors to practice the manipulation of the catheter and to understand the implications of different electrode configurations before ever touching a patient. This aspect of virtual modeling is crucial for reducing procedural errors and increasing the success rates of complex interventions such as cardiac ablation.

With continued reference to FIG. 2, mapping all possible Relative Configurations (RCs) 208 of a catheter assembly 100 can be done by physically mapping each RC. This approach may involve physically mapping every possible RC by actually manipulating the catheter within a controlled environment, such as a mock-up of human vessels or an animal model. This method provides real-world data and insights into how the catheter and its electrodes behave under actual operating conditions. During physical mapping, the processor 204 documents and analyzes the catheter's mechanical properties and operational performance, capturing subtle nuances and potential issues that might not be evident in virtual simulations. Physical mapping may allow for processor 204 to record the mechanical limitations and performance issues that may not be entirely apparent in a virtual model. By physically mapping each RC, potential mechanical limitations such as bending resistance, torque stability, and electrode contact efficiency with biological tissues are directly observed and recorded. This method not only verifies theoretical models but also helps refine the catheter's design by highlighting areas for improvement, ensuring that the final product performs optimally in real clinical environments. This comprehensive testing through physical mapping is essential for understanding the catheter's capabilities and limitations, providing a solid foundation for safe and effective clinical use.

With continued reference to FIG. 2, tank data 206 may be used to generate Relative Configurations (RCs) 208 for the catheter assembly 100 relative to fiduciary points. As used in the current disclosure, a "fiduciary point" is defined as a specific location utilized as a reference or marker, crucial for precise measurement, navigation, or alignment within various procedural settings. These points are strategically selected to ensure consistent and precise control throughout medical or experimental procedures. Specifically, fiduciary points may serve as critical navigational aids that enable accurate positioning and orientation of the catheter within a biological chamber or a simulated environment designed to closely replicate the electrical properties of human tissues. In an embodiment, a fiduciary point may be an anatomical feature within the biological chamber such as a target area. By leveraging these points, processor 204 can enhance the accuracy and effectiveness of catheter placement, ensuring that the electrodes or sensors are optimally positioned to interact with target tissues, thereby improving the outcomes of diagnostic or therapeutic interventions.

With continued reference to FIG. 2, processor 204 is configured to generate a plurality of relative configurations using a compliant configuration generator (CCG) 212. As used in the current disclosure, a "compliant configuration generator" is a model that is configured to explore and produce relative configuration that adhere to set physical and operational constraints. This might include ensuring that electrodes on a catheter 100 are spaced correctly to optimize therapeutic effectiveness and safety, or adjusting the configuration to accommodate anatomical variations among different patients. The CCG 212 may be used to systematically explore and produce viable RCs 208, ensuring that each configuration adheres to predefined physical constraints. These constraints might include maintaining certain distances or geometric relationships between electrodes. The CCG 212 may be particularly useful in complex devices where manual configuration would be impractical or prone to error. The CCG 212 may operate based on a set of algorithms that define the permissible arrangements of the device's components. It may account for various factors such as the physical properties of the device, the biomechanical properties of the environment (e.g., tissue elasticity and density), and the operational parameters (e.g., the need for certain electrodes to be closer to specific anatomical features for effective treatment or measurement). The CCG may use this information to simulate and validate different configurations, ensuring each meets the necessary criteria for compliance with the physical and operational constraints. In practice, the CCG may be integrated into processor 204, where it works in real-time to adjust the configuration of electrodes or other components during a procedure. For example, in a cardiac catheterization procedure, the CCG 212 might adjust the positions of electrodes to optimize contact with the heart tissue, based on the feedback received from the device's sensors about the heart's electrical activity and the physical contact between the catheter and the heart tissue. The use of a Compliant Configuration Generator 212 may enhance the precision and adaptability of medical devices. By ensuring that each configuration strictly adheres to defined constraints, the CCG helps minimize risks associated with improper placement or functioning of the device. Additionally, it may support the execution of complex medical procedures by automating the configuration process, thus reducing the cognitive load on clinicians, and allowing them to focus more on patient care rather than device manipulation.

With continued reference to FIG. 2, a CCG 212 may be a machine-learning model that is configured to generate and map a plurality of relative configuration 208. The CCG 212 may be used to actuate the catheter assembly 100 into a number of RC 208. In an embodiment, the CCG 212 may also be configured to map the plurality of RCs 208 as they are identified. Compliant configuration generator 212 may be consistent with the machine-learning model described below in FIG. 3. Inputs to the compliant configuration generator 212 may include tank data 206, fiduciary points, constraint pairs 116, examples of relative configuration 208, and the like. Outputs to the compliant configuration generator 212 may include relative configuration 208 tailored to the constraint pairs 116 and/or tank data 206. CCG training data may include a plurality of data entries containing a plurality of inputs that are correlated to a plurality of outputs for training a processor by a machine-learning process. In an embodiment, CCG training data may include a plurality of constraint pairs 116 correlated to examples of relative configurations 208. Alternatively, CCG training data may include a plurality of tank data 206 correlated to examples of relative configurations 208. CCG training data may be received from database 300. CCG training data may contain information about tank data 206, fiduciary points, synthetic tank data, constraint pairs 116, examples of relative configurations 208, and the like. In an embodiment, CCG training data may be iteratively updated as a function of the input and output results of past compliant configuration generator 212 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued refence to FIG. 2, the CCG 212 may be trained using tank data 206 as a foundational training dataset. In training the CCG 212, this tank data may be used to establish a baseline understanding of how specific configurations influence the electrical and physical properties measured during the experiments. Machine learning algorithms within the CCG 212 can then analyze this data to identify patterns and relationships between the configurations and their outcomes. By training on this dataset, the CCG may learn to predict which configurations will yield the most effective interactions based on the desired procedural outcomes, such as maximizing tissue contact or optimizing energy delivery for ablation. The training process may include iterative adjustments to the CCG's algorithms, continually refining the model by comparing predicted outcomes with actual data from the tank experiments. This ongoing calibration helps enhance the accuracy and reliability of the CCG, enabling it to dynamically generate configurations that are tailored to specific procedural needs.

Ultimately, training the CCG with tank data not only improves the device's operational efficiency but also enhances the safety and effectiveness of catheter-based interventions by ensuring that the device operates within optimal parameters in real-world clinical environments.

With continued reference to FIG. 2, the CCG 212 could be used to generate synthetic tank data. This may be used to offer an efficient and controlled method for simulating and analyzing the behavior of catheter assemblies 100 under various configurations without the need for physical testing environments. By incorporating detailed models of the catheter's physical and electrical properties, the CCG 212 can simulate the interactions between the catheter's electrodes and a virtual conductive medium designed to mimic human tissue properties. This process may include setting up virtual experiments within the CCG where different Relative Configurations (RCs) of the catheter's electrodes are tested against virtual models of biological environments. The synthetic tank data generated by CCG 212 may include simulated impedance measurements, voltage drops, and other relevant electrical parameters that would typically be collected from actual saline tank experiments. These data points may be calculated based on the known properties of the electrodes and the simulated medium, adjusted for various hypothetical scenarios such as changes in salinity or tissue composition. The CCG may rapidly iterate through numerous configurations, adjusting electrode positions and recording the resulting electrical responses, thereby providing a rich dataset that can be used to refine catheter designs and optimize their functionality.

With continued reference to FIG. 2, The compliant configuration generator (CCG) 212 may be used to operate medical devices such as catheters with multiple electrodes, where it is responsible for generating relative configurations (RCs) 208. The CCG 212 may operate by calculating and implementing various arrangements of electrodes or other components on a medical device, ensuring each configuration conforms to predefined physical and operational constraints (i.e., constraint pairs 116). In an embodiment, the process may include defining the constraints for the configurations. These constraints could include specific distances between electrodes such as constraint pairs 116, angles relative to the catheter shaft, or the need to align with particular anatomical features. Constraints may ensure that the configurations are feasible and optimized for clinical effectiveness and patient safety. Using a mathematical models and simulations, the CCG 212 may process the defined constraints to explore possible configurations. This simulation may account for the mechanical properties of the catheter, such as flexibility and torsion, and the interaction of the electrodes with the biological environment, such as tissue conductivity and geometry. The CCG may employ an optimization algorithm to determine the best possible configurations that meet all the constraints. These algorithms might use techniques from fields such as operations research, artificial intelligence, or machine learning to efficiently search through potential configurations and select those that optimize clinical outcomes. Throughout the configuration process, the CCG 212 may incorporate real-time feedback from the device's sensors or from intraoperative imaging systems. This feedback may allow the CCG to adjust the configurations dynamically in response to changes in the surgical field or patient anatomy. For example, if the catheter shifts or the target tissue's properties change, the CCG recalculates the configurations to adapt accordingly. Once optimal configurations are determined, the CCG 212 may instruct the catheter to adjust its electrodes to these new positions. This adjustment can be automated within the device, allowing for quick changes that are seamless and require minimal intervention from the medical staff. In a clinical setting, the ability of the CCG 212 to generate and implement RCs 208 may be employed in procedures that require high precision, such as cardiac ablation or neurological stimulations. By ensuring that the electrode configurations are always optimal, the CCG enhances the efficacy of the therapeutic or diagnostic procedure, minimizing risks and improving patient outcomes.

With continued reference to FIG. 2, the CCG 212 may be adept at filtering Relative Configurations 208 based on a target area. As used in the current disclosure, a "target area" is a specific region or zone within the body where medical intervention is required. A target area could be a particular section of heart tissue affected by arrhythmia, a tumor within an organ, or a blockage in a vascular pathway. This precision is crucial for procedures where the specificity of intervention directly correlates with the success and safety of the treatment. In practice, the CCG 212 may utilize detailed anatomical and physiological data to define the target area's characteristics, such as its geometry, electrical properties, or tissue density. Using this data, the CCG 212 may apply a set of criteria to evaluate each possible RCs 208 to ensure that the configurations are not only physically feasible but also optimal for interacting with the target area. For instance, in a cardiac ablation procedure, the CCG 212 filters the RCs to ensure that the electrodes align precisely with the areas of abnormal electrical activity without affecting surrounding healthy tissue. It may dynamically adjust the electrodes' positions based on real-time feedback about their efficacy and the tissue's response, refining the approach to enhance therapeutic outcomes. By filtering RCs in this way, the CCG may ensure that medical interventions are accurate, minimizing unnecessary exposure and maximizing the therapeutic impact on the target area. This targeted approach helps in reducing procedure times, improving healing rates, and enhancing overall patient safety.

With continued reference to FIG. 2, processor 204 may be configured to generate a constraint compliance metric 216 for each relative configuration 208 of the plurality of relative configurations. As used in the current disclosure, a "constraint compliance metric" is a metric used to assess how well each configuration of the device adheres to predefined physical and operational constraints. These constraints may ensure the device's functionality, safety, and effectiveness during medical procedures. The CCM 216 may be designed to evaluate the degree to which a device's configuration, or Relative Configuration (RC), meets established guidelines regarding distances, angles, and other spatial relationships between components (such as electrodes on a catheter). The metric may provide a numerical value or a set of values that reflect the compliance of each configuration with these constraints. To generate the CCM 216, processor 204 may assess each configuration by comparing the actual measurements (distances, angles, etc.) obtained from the device's sensors against the predefined constraints. The processor may employ algorithms designed to evaluate these measurements and calculate the CCM, which can indicate whether a particular configuration is within acceptable limits. The CCM 216 may enable the processor to identify the most effective configurations that not only meet the safety and operational requirements but also optimize the therapeutic or diagnostic outcomes of the procedure. For instance, in cardiac ablation, ensuring that the electrode configuration strictly adheres to constraints can enhance the precision of lesion placement and the overall success of the procedure.

Recording the CCM 216 for each configuration throughout a procedure creates a detailed record that can be used for quality control, training, and future improvements in device design and operation.

With continued reference to FIG. 2, the qualification of the Constraint Compliance Metric (CCM) 216 may involve a systematic evaluation for ensuring each Relative Configuration (RC) of a medical device. The qualification of the CCM 216 may begin by defining the specific constraints that each configuration of the device must meet. These constraints are meticulously set based on the device's intended use, safety requirements, and the physical properties necessary for effective operation. This may include ensuring components such as electrodes are positioned at optimal distances from each other to maximize effectiveness and minimize risk. Verifying that the angles between components align with the necessary parameters for accurate targeting and energy delivery. Checking that the spatial arrangement of the components facilitates proper interaction with the target tissues or organs. Processor 204 may measure actual configurations during medical procedures. It may collect data from sensors embedded in the device that record real-time distances, angles, and other relevant parameters. This data may be compared against the predefined constraints. The processor may employ algorithms to analyze this information and calculate the CCM, which quantifies how closely the actual measurements align with the set constraints. In an embodiment, the CCM 216 provides a numerical value or a set of values that clearly indicate the degree of compliance for each configuration. This numerical assessment may help processor 204 understand whether a particular configuration is within acceptable limits or needs adjustment. A configuration that scores highly on the CCM 216 signifies a high level of compliance, indicating that it is optimal for proceeding with the procedure. By qualifying each configuration using the CCM 216, processor 204 can identify and recommend the most effective configurations that not only meet safety and operational standards but also optimize the therapeutic or diagnostic outcomes. For example, in a procedure like cardiac ablation, a high CCM 216 score would mean the electrode configuration is precisely aligned to target and effectively treat arrhythmic tissues, thereby enhancing the precision of lesion placement and overall procedural success.

With continued reference to FIG. 2, processor 204 may be configured to optimize the CCM 216 for each relative configuration of the plurality of relative configurations 208. The optimization process may include data collection and analysis, where real-time measurements of electrode configurations are assessed against constraint pairs 116. Processor 204 may optimize the CCM 216 to ensure that the medical devices operate within the safest and most effective parameters during procedures. This optimization m enhances the device's precision and adaptability, allowing it to deliver targeted therapeutic interventions more accurately and safely. By refining the CCM, processor 204 can reduce the risk of complications, and increase the overall efficiency of medical treatments. Additionally, an optimized CCM 216 may contribute to better patient experiences and outcomes by ensuring that the device adheres to stringent safety standards and operates at peak performance, aligning closely with clinical needs and specific patient anatomies. As part of the optimization, the initial constraints 116 may be reevaluated and adjusted based on new clinical insights or technological advances, necessitating a recalibration of the CCM. Once optimized, these metrics guide the dynamic adjustment of the catheter's electrode configurations during procedures. The processor can manage multiple optimized configurations tailored to various scenarios, choosing the most appropriate one in real-time to suit specific procedural needs or patient-specific anatomies. This ability ensures that adjustments to configurations are proactive, based on current compliance levels, maintaining the device's operation within optimal parameters at all times.

With continued reference to FIG. 2, optimizing the CCM may involve refining how well the relative configurations 208 of a medical device meet predefined operational and safety constraints during medical procedures. This process may include data collection from the medical device during actual clinical use or through simulated environments. This data may include measurements related to the positioning and interaction of electrodes, such as distances and angles between them, which are compared against established constraints that ensure safety and functionality. The CCM may be calculated by processor 204, which assesses the deviation of actual configurations from these ideal constraints. To optimize the CCM, algorithms, often enhanced with machine learning capabilities, may be employed to analyze this data. These algorithms identify patterns and configurations that lead to minimal compliance errors, adjusting the metrics that define optimal configurations accordingly. This optimization may be iterative, continually refining the CCM as more data is collected and analyzed, allowing the system to adapt to new findings and improve its predictive accuracy. Feedback from clinical outcomes may be used within this optimization process. Real-time data on the success or failure of specific configurations informs adjustments to the CCM, ensuring that it remains relevant and accurate in predicting the safest and most effective device configurations. Moreover, this continual feedback loop allows the device to dynamically adjust configurations during procedures based on the optimized CCM, promoting better procedural outcomes and patient safety.

With continued reference to FIG. 2, processor 204 may adjust the plurality of relative configurations 208 based on the optimized Constraint Compliance Metric (CCM). The processor 204 may utilizes the CCM 216 to dynamically manage and refine the spatial arrangement of electrodes to ensure they operate within optimal parameters. The process may continuously monitor the real-time data collected from the device's sensors, which measure distances, angles, and other relevant metrics between electrodes during a procedure. Once the processor calculates the current CCM 216 for a given configuration, it may assess whether this configuration meets the optimized compliance standards. If the configuration falls outside these standards, indicating potential inefficiencies or safety concerns, processor 204 may initiate adjustments. These adjustments may include shifting the positions of the electrodes, either by extending, retracting, or reorienting them to better align with the optimized CCM. This real-time adjustment capability of processor 204 may be used to adapt to the varying anatomical and physiological conditions encountered during medical procedures, ensuring that the device configuration remains within the safest and most effective setup as delineated by the CCM. Furthermore, the processor's ability to make these adjustments on-the-fly enhances the overall efficacy of the medical intervention. It may allow the device to maintain optimal interaction with the target tissues, improving the precision of therapeutic actions such as ablation or diagnostic measurements.

With continued reference to FIG. 2, processor 204 may be configured to optimize the CCM 216 using an optimization machine-learning model 220. As used in the current disclosure, a "optimization machine-learning model" is a machine-learning model that is configured to generate CCM 216. optimization machine-learning model 220 may be consistent with the machine-learning model described below in FIG. 2. Inputs to the optimization machine-learning model 220 may include constraint pairs 116, relative configurations 208, examples of CCM 216, and the like. Outputs to the optimization machine-learning model 220 may include CCM 216 tailored to the relative configurations 208. optimization training data may include a plurality of data entries containing a plurality of inputs that are correlated to a plurality of outputs for training a processor by a machine-learning process. In an embodiment, optimization training data may include a plurality of relative configurations 208 correlated to examples of CCM 216. optimization training data may be received from database. optimization training data may contain information about relative configurations 208, examples of CCM 216, and the like. In an embodiment, optimization training data may be iteratively updated as a function of the input and output results of past optimization machine-learning model 220 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 2, processor 204 may be configured to generate a compliant configuration distribution 224 as a function of the plurality of relative configurations 208. As used in the current disclosure, a "compliant configuration distribution" is a mathematical model that encapsulates all the viable configurations of a medical device's components which conform to established physical and operational constraints. These constraints might include spatial relationships, distances, angles, and other parameters that ensure the device functions within its optimal range, reducing risks and enhancing efficacy during medical procedures. The generation of a CCD 224 may begin with the detailed definition of constraints that each configuration of a device must adhere to for safe and effective operation. These constraints may be based on the physical and operational parameters of the device, such as distances, angles, and spatial relationships among the components like electrodes on a catheter. The process may start with the creation of a theoretical model for each potential configuration, which is then tested against these predefined constraints using computational simulations. In these simulations, each configuration 208 may be evaluated for its compliance with the constraints, utilizing algorithms that can accurately measure and analyze factors like the mechanical flexibility of the device, the electrical properties of the electrodes, and the interaction of the device with a simulated physiological environment. Only those configurations that meet or exceed the defined compliance thresholds are included in the CCD 224. This selective inclusion ensures that every configuration within the distribution is viable and can be safely used in clinical settings. The generation of the CCD 224 may include iterative testing and refinement. As configurations are tested, data is collected and analyzed, providing insights into how slight modifications to the configurations can impact compliance. Machine learning techniques can be employed to optimize this process, allowing the system to learn from each simulation cycle, thereby progressively improving the accuracy and reliability of the CCD 224. Once the CCD 224 is established, it serves as a dynamic reference database for the device's operation, allowing quick selection and switching between different compliant configurations during actual use. This ensures that the device operates within safe operational parameters while maintaining the flexibility needed to adapt to various clinical conditions or procedural requirements. The CCD 224 is not static; it can be updated as new data becomes available or as device modifications are made, ensuring that it remains a relevant and effective tool for managing device configurations.

With continued refence to FIG. 2, generating training data for the Compliant Configuration Generator (CCG) may include combining tank data 206 with the compliant configuration distribution. This combination may be achieved through specific placement operations, which involve applying adjustments to the compliant configuration distribution to reflect real-world scenarios accurately. Each compliant configuration may be analyzed to determine the exact spatial coordinates of each electrode in the relative configuration (RC) 208. This spatial data may be crucial as it directly influences the interaction between the electrodes and the testing environment or biological chamber, affecting the resulting voltage data. Once the exact spatial coordinates are established, a plurality of field characterizers (FCs) may be generated. As used in the current disclosure, a "field characterizers" refers quantification of the properties of an electromagnetic or electric field generated in a specific environment. FCs may be functional representations derived from the combination of voltage data and the precise spatial coordinates of the electrodes. The FCs may capture the unique electrical field properties around each electrode based on its position, which may be essential for understanding how the electrode's location influences its performance in different configurations. This step may involve using algorithms or machine learning models to correlate the observed voltage responses with the spatial arrangement of the electrodes. This dataset may serve as the training data for the CCG, providing it with a \foundation of empirical evidence and theoretical insights. By training the CCG on this dataset, the generator is may be better equipped to predict and replicate effective configurations in real-time applications, significantly enhancing the precision and adaptability of catheter-based systems in clinical settings.

With continued refence to FIG. 2, a field characterizer may be a set of parameters that capture the spatial and temporal distributions of fields such as voltage, current, impedance, or magnetic fields around the electrodes. These FCs may take into account various factors like the geometry of the electrode arrangement, the electrical properties of the tissues, and the specific configurations of the device being used. By doing so, they provide a detailed understanding of how the fields interact with biological tissues, which is critical for optimizing device performance and ensuring safety and efficacy in medical treatments. Field characterizers may be generated by computing numerical solutions to field equations under various boundary conditions imposed by the device and tissue interfaces. This might involve complex mathematical formulations and simulations using techniques from fields like finite element analysis (FEA) or computational fluid dynamics (CFD). The outputs are detailed maps or models that describe how field values such as voltage or impedance vary across the tissue, providing crucial information for medical decision-making.

With continued reference to FIG. 2, Field Characterizers (FCs) may be generated through both theoretical modeling and empirical data collection. This may include formulation of mathematical models that describe the expected behavior of electric or magnetic fields based on the physical and geometric properties of the electrodes and the biological tissues involved. These models may consider such as electrode spacing, arrangement, the conductivity of the tissues, and the frequency of the electrical signals used. To refine these theoretical models, empirical data may be collected from experiments or simulations. For example, data might be gathered by deploying a device with multiple electrodes in a controlled environment, such as a saline tank or through computational simulations that mimic interaction with human tissues. The data collected includes voltage measurements, current flows, and impedance values at various points around the electrodes. The next step may involve using numerical methods and computational tools, such as finite element analysis (FEA), to solve the field equations that describe the interactions within the modeled environment. These solutions provide detailed insights into the field distributions and are used to adjust the theoretical models to better align with observed behaviors. The refined models may be used to generate the FCs, which characterize the field properties in a format that can be easily interpreted and utilized. These characterizations might include graphical representations, like maps or 3D models of field intensity and distribution, or numerical descriptors that summarize key aspects of the field behavior. These FCs are crucial for device designers and clinicians, as they provide essential insights into how a device will interact with biological tissues, guiding both the development of new medical technologies and the optimization of existing therapies.

With continued reference to FIG. 2, processor 204 is configured to record voltage data 226 from the plurality of electrodes 108 within a biological chamber. As used in the current disclosure, "voltage data" refers to the quantitative information representing the electrical potential difference measured between two points. Voltage data 226 may be used to assess and interpret the electrical activity within various tissues of the body. This voltage data 226 may be collected by applying a small electrical current through electrodes 108 and measuring the resulting voltage drop across the tissue. The voltage measurements help to reveal the electrical properties of the tissues, such as conductivity and resistance, which can differ significantly between healthy and diseased states. The characteristics of the voltage data may vary based on the type of tissue, the health of the tissue, and the specific medical condition being addressed. For instance, healthy cardiac tissue may conduct electricity differently compared to fibrotic or arrhythmic areas. By analyzing these differences in voltage responses, processor 204 can identify abnormal or diseased tissue regions (i.e., target areas). In some cases, voltage data 226 may be used to map the heart's electrical activity. This mapping may be used to identify target areas and to understand the propagation of electrical signals within the heart, which can guide interventions like cardiac ablation.

With continued reference to FIG. 2, processor 204 is configured to record voltage data 226 from the plurality of electrodes 108 within a biological chamber. As used in the current disclosure, "voltage data" refers to the quantitative information representing the electrical potential difference measured between two points. Voltage data 226 may be used to assess and interpret the electrical activity within various tissues of the body. This voltage data 226 may be collected by applying a small electrical current through electrodes 108 and measuring the resulting voltage drop across the tissue. The voltage measurements help to reveal the electrical properties of the tissues, such as conductivity and resistance, which can differ significantly between healthy and diseased states. The characteristics of the voltage data may vary based on the type of tissue, the health of the tissue, and the specific medical condition being addressed. For instance, healthy cardiac tissue may conduct electricity differently compared to fibrotic or arrhythmic areas. By analyzing these differences in voltage responses, processor 204 can identify abnormal or diseased tissue regions (i.e., target areas). In some cases, voltage data 226 may be used to map the heart's electrical activity. This mapping may be used to identify target areas and to understand the propagation of electrical signals within the heart, which can guide interventions like cardiac ablation.

With continued reference to FIG. 2, catheter assembly 100 may be used to record different voltage data 226 around a target area for each relative configuration 208 of a catheter's electrodes. This involves systematically capturing electrical voltage data 226, which is may be used to assess the interaction between the catheter electrodes and the surrounding tissues. As the catheter is navigated to or positioned within a target area—such as a specific region of the heart affected by arrhythmias—the processor may activate the electrodes in their current configuration to emit small electrical currents. The voltage drop across the surrounding tissue, a direct indicator of the tissue's electrical properties, may be measured and recorded by the processor. Each relative configuration 208 of the electrodes may alter the way the electrical current is distributed through the tissue, thereby changing the voltage measurements. Processor 204 may record these variations, providing a detailed voltage profile for each configuration. This may include not only basic voltage measurements but also more complex metrics related to current flow and electrical potential differences, which can give insights into the composition and health of the tissue being targeted. The processor may use these metrics to create a comprehensive map of electrical properties across the target area, which can inform clinical decisions regarding the placement of the catheter for optimal therapeutic or diagnostic outcomes. The ability of processor 204 to dynamically record different voltage data is valuable for procedures requiring precise manipulation of tissues or where the efficacy of the treatment is highly dependent on accurate electrode placement. For instance, in cardiac ablation, accurately recorded voltage data help identify fibrotic or arrhythmic tissues, guiding the ablation process to ensure that only pathological tissues are targeted while minimizing damage to healthy areas. This targeted approach enhances the safety and effectiveness of the procedure, optimizing patient outcomes.

With continued refence to FIG. 2, processor 204 is configured to record voltage data 226 from the plurality of electrodes 108 within a biological chamber. As used in the current disclosure, a "biological chamber" refers to a specific anatomical cavity within the body that serves a distinct physiological function and can be targeted for medical interventions. These chambers may include but are not limited to parts of the heart such as its atria or ventricles, the bladder, circulatory system, digestive system, or any other organ spaces that might require diagnostic or therapeutic procedures. For example, chambers of the heart can be key focus areas in procedures targeting arrhythmias, while the bladder might be examined for issues like tumors or infections. A target area may refer to a defined section within a biological chamber where a medical intervention is needed.

This could be a particular portion of heart tissue exhibiting signs of arrhythmia, a localized tumor in an organ, or a blockage in a vascular pathway within these chambers. Accurately defining and targeting these areas is crucial for the success and safety of medical treatments, as precision directly impacts the effectiveness of the intervention and the well-being of the patient.

With continued reference to FIG. 2, processor 204 is configured to map a plurality of impedance metrics 228 for each relative configuration 208 of the plurality of relative configurations as a function of the voltage data 226. As used in the current disclosure, an "impedance metrics" refers to a set of data points that measure the electrical impedance characteristics across various electrode configurations. These impedance metrics 228 may be used to evaluate the interactions between the catheter electrodes and the surrounding tissues, providing insights into tissue properties, catheter placement, and effectiveness of the medical procedure. Impedance metrics 228 may measure how easily electricity can pass through tissues, which varies depending on the type of tissue and its condition. Voltage data 226 may be used to calculate impedance metrics 228. By applying a known current through electrodes 108 and measuring the resulting voltage across them, one can derive the impedance using the basic Ohm's Law relationship. This method allows for the direct calculation of impedance by capturing how much the tissue or material resists the electrical flow. These measurements can include but are not limited to, resistance (the direct opposition to current flow), reactance (the resistance caused by capacitance or inductance), and phase angle (the difference in phase between the voltage and current). Collectively, these metrics give a detailed picture of the electrical properties of the tissues at the electrode sites. Processor 204 may be configured to record these impedance metrics from each electrode configuration, which can vary significantly depending on the relative positions of the electrodes (Relative Configurations 208). As the electrodes are repositioned into different configurations, processor 204 may measure and log the impedance at each configuration. This process involves sending a small, controlled electrical current through the electrodes and measuring the resulting voltage drop, thereby calculating the impedance. The impedance metrics 228 may be used for several medical purposes. Changes in impedance can help identify pathological tissues such as fibrotic or necrotic areas, which may have different electrical characteristics compared to healthy tissues. For example, in cardiac ablation procedures, areas of the heart with arrhythmic pathways might show different impedance values than normal heart muscle. By analyzing impedance metrics 228, processor 204 can better target their therapeutic efforts. In procedures like tumor ablation, impedance measurements can help confirm that the energy delivered is effectively reaching and affecting the target tissues. Impedance metrics 228 can also indicate whether the electrodes are in good contact with the tissue, which is essential for the effective delivery of energy or collection of data.

With continued reference to FIG. 2, each impedance metric 228 may be mapped to a location within a biological chamber. This may be done using mapping algorithms to correlate these metrics to specific locations within the biological chamber. This spatial mapping may be used to create a visualization of the distribution of electrical properties across the tissue, enabling precise localization of areas requiring medical intervention. For example, in the context of cardiac mapping, impedance variations detected across different heart segments can precisely pinpoint regions of arrhythmic activity or fibrotic development. This detailed mapping supports clinicians in planning and executing targeted treatments more effectively. Processor 204 may map each impedance metric 228 to specific locations within a biological chamber by leveraging the information from the Relative Configurations (RC) of the electrodes on the catheter assembly. This process may include the deployment and manipulation of the catheter assembly 100 within a biological chamber, where each RC 208 of the electrodes 108 are strategically positioned to gather detailed electrical impedance data from different tissue sites. As each RC is activated, processor 204 collects voltage data 226 or impedance data 228 from the tissue. The processor may use the known spatial coordinates of each electrode configuration to accurately associate each impedance measurement with its corresponding location in the biological chamber. The mapping process may include complex algorithms or machine learning models that process the collected impedance data in conjunction with the catheter's positional data. This includes translating the three-dimensional coordinates of each electrode relative to the fiduciary points and other anatomical landmarks within the biological chamber. By integrating this positional data with the impedance metrics, processor 204 creates a detailed spatial map that highlights areas of varying electrical properties. In a non-limiting example, when treating cardiac arrhythmias, the processor can identify and visualize regions within the heart that exhibit abnormal electrical behavior, guiding the precise delivery of therapies such as ablation.

With continued reference to FIG. 2, processor 204 is configured to generate an impedance model 236 as a function of mapping the plurality of impedance metrics 228. As used in the current disclosure, an "impedance model" is mathematical or computational representation that correlates various impedance measurements taken from a medical device. This model may be used to interpret the electrical properties of tissues encountered during medical procedures, such as cardiac mapping or tumor ablation, and adjusting the device's operation accordingly. This model may be generated by collecting and analyzing the plurality of impedance metrics 228, such as resistance, reactance, and phase angle, from multiple electrodes deployed on a catheter assembly 100 in different configurations. The collected data provides insights into how electrical currents interact with different tissues, reflecting unique characteristics such as conductivity and permittivity. An impedance model 132 may be generated with data collected from these electrodes as they come into contact with various tissues during medical procedures. In an embodiment, statistical and machine learning techniques may be applied to the impedance metrics 228 to create correlations between impedance measurements and known tissue characteristics. These correlations form the basis of the model, which can predict the type of tissue based on its impedance signature. By characterizing tissues according to their electrical properties, the model enhances the specificity and efficacy of treatments. For instance, in the field of electrophysiology, it enables precise mapping of heart tissues to identify problematic areas causing arrhythmias, guiding interventions with a high degree of accuracy. Similarly, in oncological applications, it assists in distinguishing between malignant and benign tissues, allowing for targeted ablation that spares healthy cells, thus reducing collateral damage and improving patient recovery times. The impedance model may offer real-time insights during procedures, assisting clinicians in making informed decisions. For instance, in cardiac ablation procedures, the model can identify cardiac tissues that exhibit abnormal electrical patterns, guiding the ablation catheter to target only the arrhythmic areas. Similarly, in oncology, the impedance model can help differentiate between cancerous and healthy tissues, ensuring precise targeting during ablation therapies.

With continued reference to FIG. 2, impedance model 232 may be developed through the data gathered by catheter assembly 100. The model may leverage the impedance metrics 228 to create a detailed 3D mapping of the heart's internal structures. As the catheter navigates through the cardiac chambers, its electrodes collect impedance data at various locations, which include measurements of resistance, reactance, and phase angle, reflecting how electrical currents interact with different cardiac tissues. This collected data is intricately analyzed and used to construct a comprehensive 3D impedance map of the heart. This map may be used to identify identifying areas of pathological or abnormal tissue properties, such as those found in regions generating arrhythmic signals or fibrotic changes. The impedance model may process this array of data points to delineate the electrical properties spatially across the heart's anatomy, enabling medical professionals to visualize the functional and structural characteristics of heart tissue in three dimensions. Such detailed impedance mapping is invaluable, particularly in procedures like cardiac ablation, where precise targeting based on tissue electrical properties can significantly enhance the accuracy and outcomes of the treatment, ensuring that only the aberrant tissues are modified or removed, thus preserving the healthy heart tissue.

With continued reference to FIG. 2, the impedance model 232 may be used to identify target areas within the body by utilizing detailed impedance metrics 228 collected by a catheter assembly. By analyzing the electrical properties of the 3D environment, the model can distinguish between different types of tissues based on their unique electrical signatures. For instance, in cardiac procedures, the impedance model can identify areas of the heart that exhibit abnormal electrical activity indicative of arrhythmogenic zones. This capability allows clinicians to pinpoint the exact locations (i.e., target areas) where interventions, such as ablations, should be targeted to treat cardiac arrhythmias effectively. Similarly, in oncological applications, the impedance model may assist in identifying the boundaries of a tumor by recognizing the distinct impedance profiles of malignant versus non-malignant tissues, facilitating precise surgical interventions or targeted therapies.

With continued reference to FIG. 2, an impedance model 232 may include an impedance machine-learning model 236. As used in the current disclosure, a "impedance machine-learning model" is a machine-learning model that is configured to generate impedance model 232. Impedance machine-learning model 236 may be consistent with the machine-learning model described below in FIG. 2. Inputs to the impedance machine-learning model 236 may include RCs 208, CCM 216, CCD 224, impedance metrics 228, examples of impedance model 232, and the like. Outputs to the impedance machine-learning model 236 may include impedance model 232 tailored to the impedance metrics 228. Impedance training data may include a plurality of data entries containing a plurality of inputs that are correlated to a plurality of outputs for training a processor by a machine-learning process. In an embodiment, impedance training data may include a plurality of impedance metrics 228 correlated to examples of impedance model 232. Impedance training data may be received from database 300. Impedance training data may contain information about RCs 208, CCM 216, CCD 224, impedance metrics 228, target areas, tank data, FC, examples of impedance model 232, and the like. In an embodiment, impedance training data may be iteratively updated as a function of the input and output results of past impedance machine-learning model 236 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 2, machine learning plays a crucial role in enhancing the function of software for generating an impedance machine-learning model 236. This may include identifying patterns within the impedance metrics 228 that lead to changes in the capabilities of the impedance machine-learning model 236. By analyzing vast amounts of data related to impedance metrics 228, machine learning algorithms can identify patterns, correlations, and dependencies that contribute to the generation of impedance machine-learning model 236. These algorithms can extract valuable insights from various sources, including text, document, EHRs, medical records, and the like. By applying machine learning techniques, the software can generate impedance model 232 extremely accurately and quickly. Machine learning models may enable the software to learn from past collaborative experiences of the entities and iteratively improve its training data over time.

With continued reference to FIG. 2, processor 204 may be configured to update the impedance training data of the impedance machine-learning model 236 using user inputs. an impedance machine-learning model 236 may use user input to update its training data, thereby improving its performance, speed, and accuracy. In embodiments, the impedance machine-learning model 236 may be iteratively updated using input and output results of past iterations of the impedance machine-learning models 236. The impedance machine-learning model 236 may then be iteratively retrained using the updated impedance training data. For instance, and without limitation, impedance machine-learning model 236 may be trained using a first training data from, for example, and without limitation, training data from a user input or database. The impedance machine-learning model 236 may then be updated by using previous inputs and outputs from the impedance machine-learning model 236 as second set of training data to then retrain a newer iteration of impedance machine-learning model 236. This process of updating the impedance machine-learning model 236 and its associated training data may be continuously done to create subsequent impedance machine-learning model 236s to improve the speed and accuracy of the impedance machine-learning model 236. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience. The discussion within this paragraph may apply to both the impedance machine-learning model 236 and any other machine-learning model/classifier discussed herein.

With continued reference to FIG. 2, incorporating the user feedback may include updating the training data by removing or adding correlations of user data to a path or resources as indicated by the feedback. Any machine-learning model as described herein may have the training data updated based on such feedback or data gathered using any method described herein. For example, when correlations in training data are based on outdated information, a web crawler may update such correlations based on more recent resources and information.

With continued reference to FIG. 2, processor 204 may use user feedback to train the machine-learning models and/or classifiers described above. For example, machine-learning models and/or classifiers may be trained using past inputs and outputs of the machine-learning model. In some embodiments, if user feedback indicates that an output of machine-learning models and/or classifiers was "unfavorable," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, machine-learning models may be retrained with modified training data as described in further detail below. In some embodiments, training data of classifier may include user feedback.

With continued reference to FIG. 2, in some embodiments, an accuracy score may be calculated for the machine-learning model and/or classifier using user feedback. For the purposes of this disclosure, "accuracy score," is a numerical value concerning the accuracy of a machine-learning model. For example, the accuracy/quality of the output impedance machine-learning model 236 may be averaged to determine an accuracy score. In some embodiments, an accuracy score may be determined for pairing of entities. Accuracy score or another score as described above may indicate a degree of retraining needed for a machine-learning model and/or classifier. Processor 204 may perform a larger number of retraining cycles for a higher number (or lower number, depending on a numerical interpretation used), and/or may collect more training data for such retraining. The discussion within this paragraph and the paragraphs preceding this paragraph may apply to both the impedance machine-learning model 236 and/or any other machine-learning model/classifier mentioned herein.

Still referring to FIG. 2, processor 204 may be configured to display the impedance model 232 using a display device 240. As used in the current disclosure, a "display device" is a device that is used to display a plurality of data and other digital content. A display device 240 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pulldown menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 3:
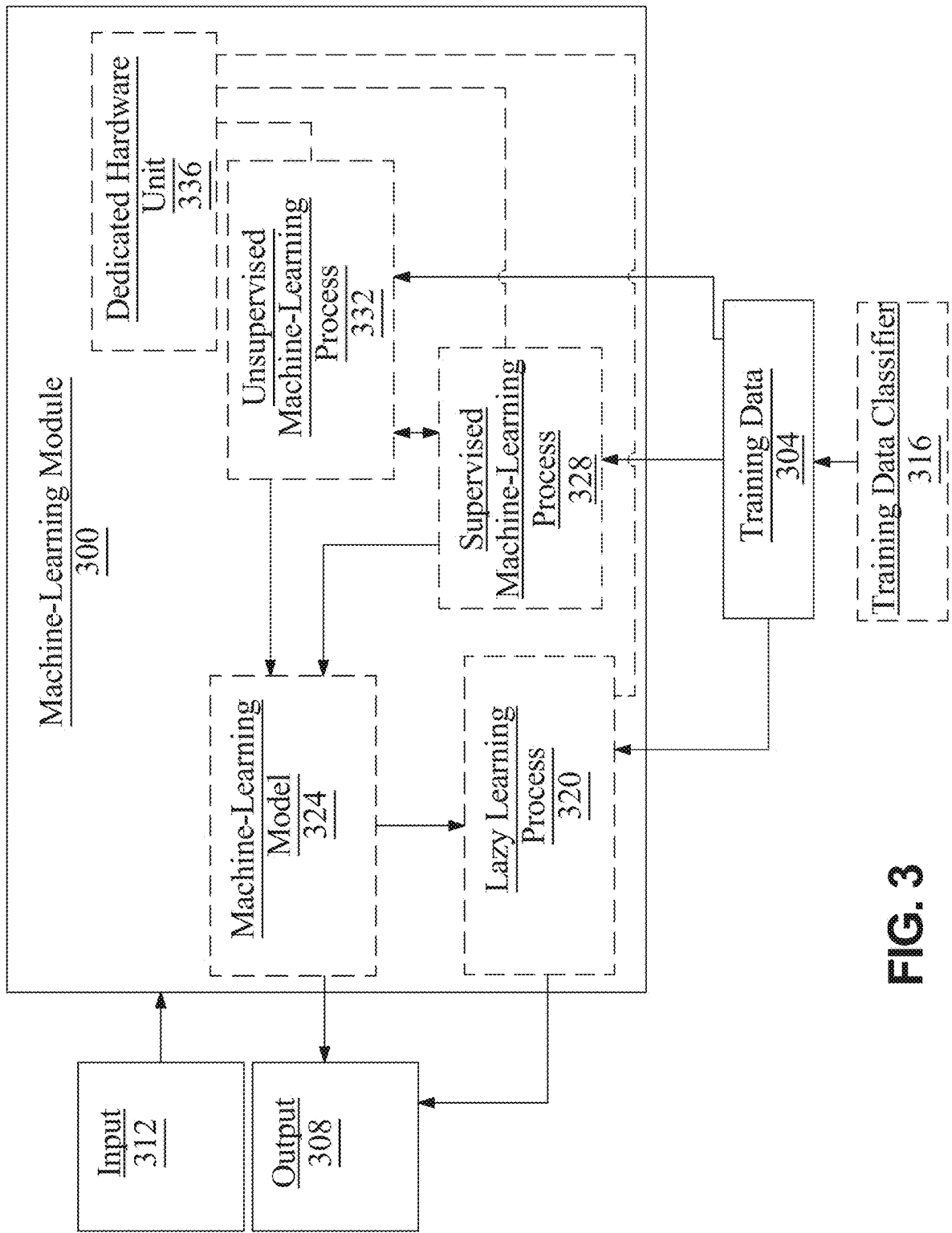
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example impedance metrics 232 as inputs correlated to an impedance model as outputs.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to specific conditions, locations, or procedures that are to be performed with the catheter assembly 100.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include impedance metrics as described above as inputs, impedance models as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system, and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
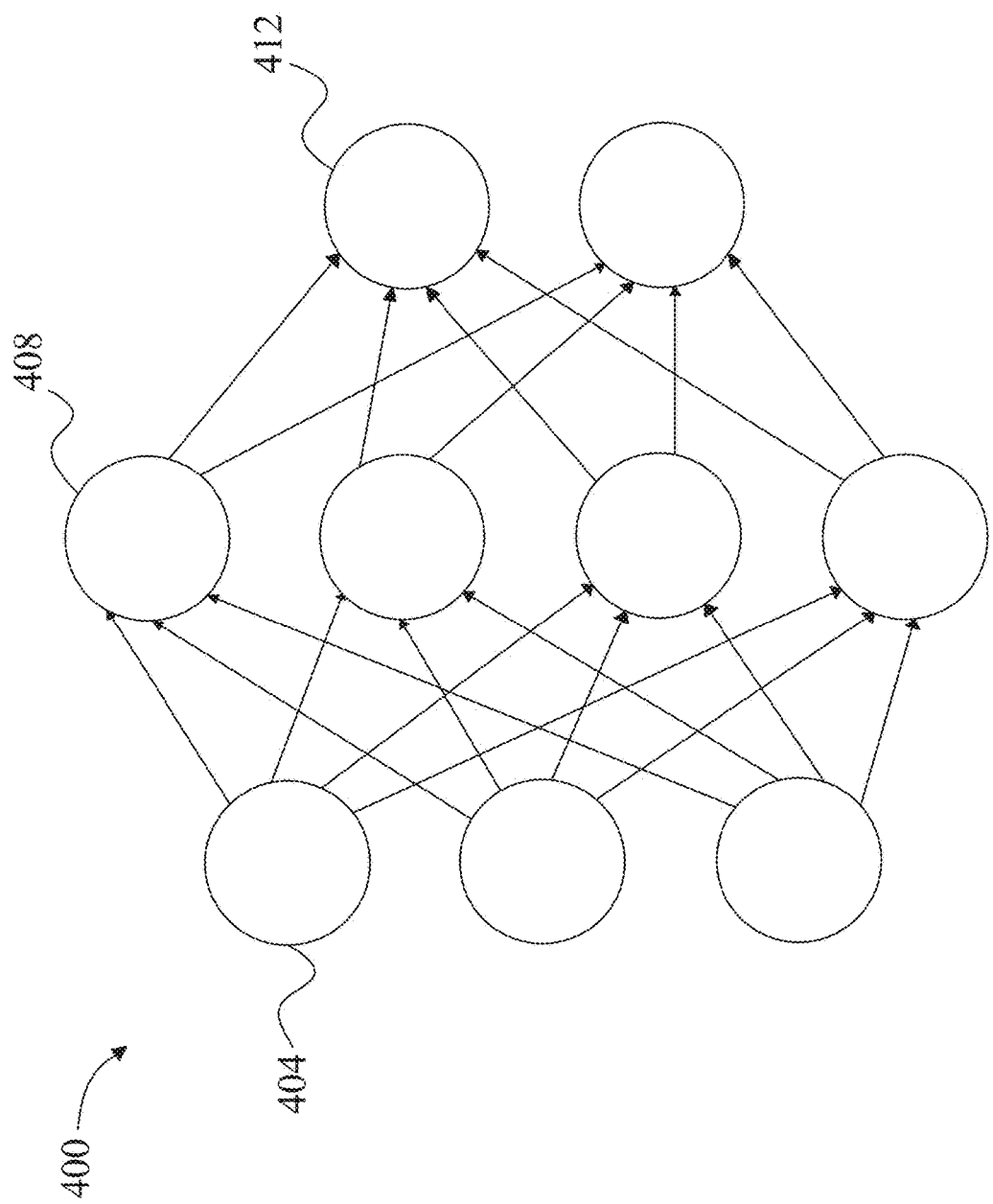
FIG. 4 is a diagram of an exemplary embodiment of a neural network.

Referring now to FIG. 4, an exemplary embodiment of neural network 400 is illustrated. A neural network 400, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
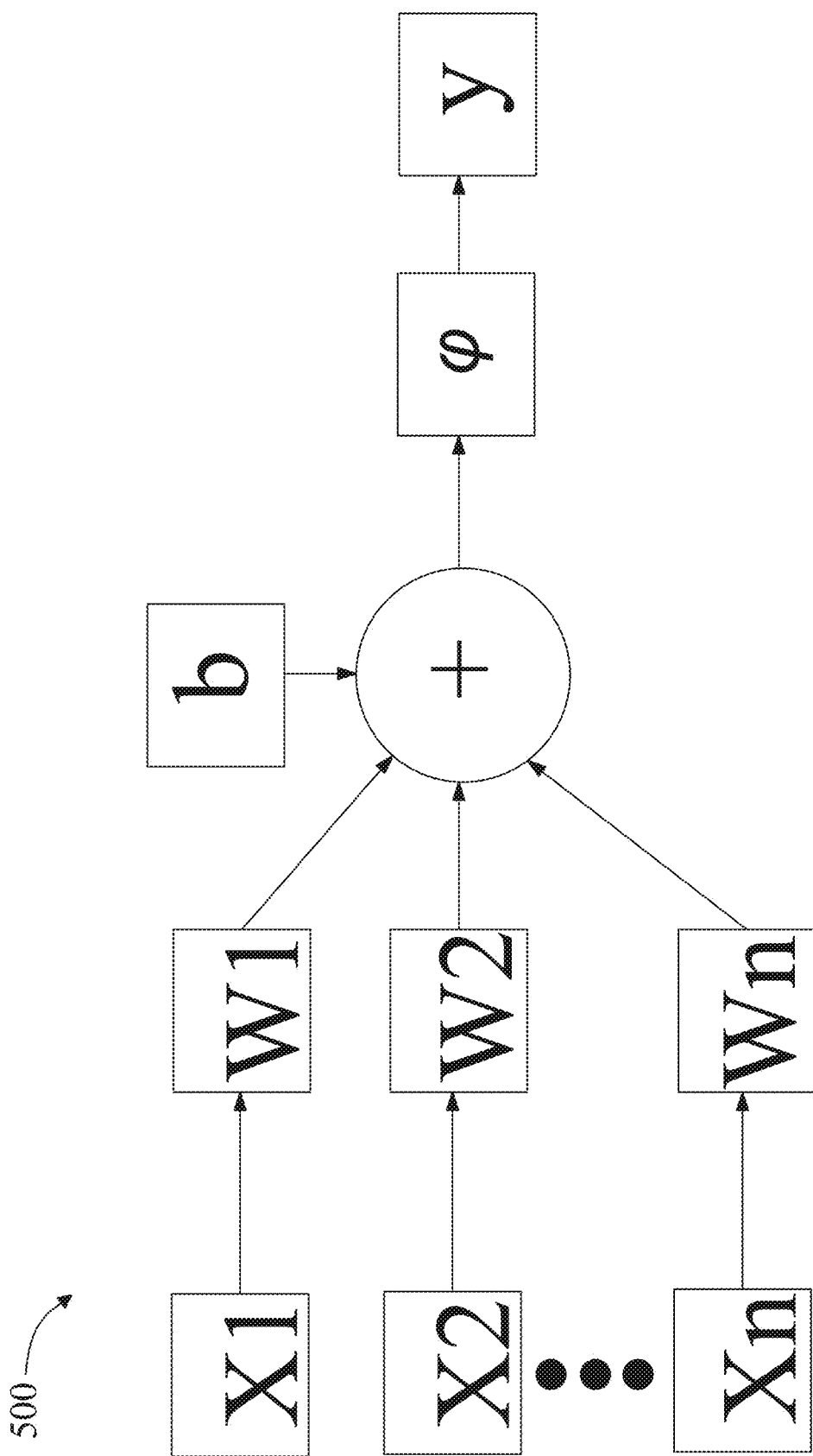
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
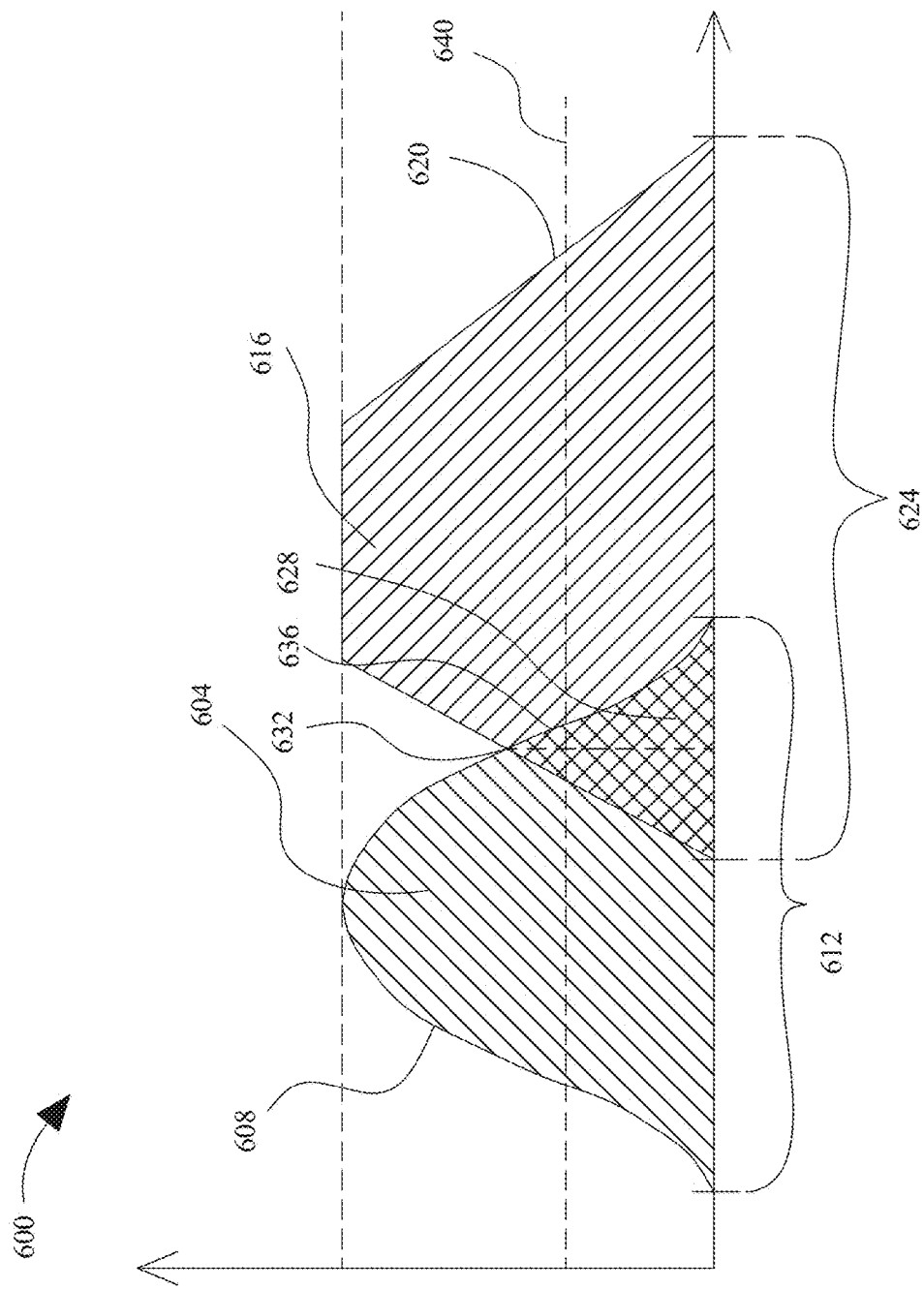
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent an impedance metrics 228 and an example of impedance models from FIG. 1.

Alternatively or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input impedance metrics 228 and examples of impedance models. For instance, an acceptance variable may represent a first measurable value pertaining to the classification of impedance metrics 228 to examples of impedance models. Continuing the example, an output variable may represent impedance models 232 associated with the user. In an embodiment, impedance metrics 228 and/or examples of impedance models may be represented by their own fuzzy set. In other embodiments, the classification of the data into impedance models 232 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)<T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any impedance metrics 228 and examples of impedance models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, the classification into one or more query categories may indicate a sufficient degree of overlap with fuzzy set representing impedance metrics 228 and examples of impedance models for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both impedance metrics 228 and examples of impedance models have fuzzy sets, impedance models 232 may be generated by having a degree of overlap exceeding a predictive threshold, processor 204 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
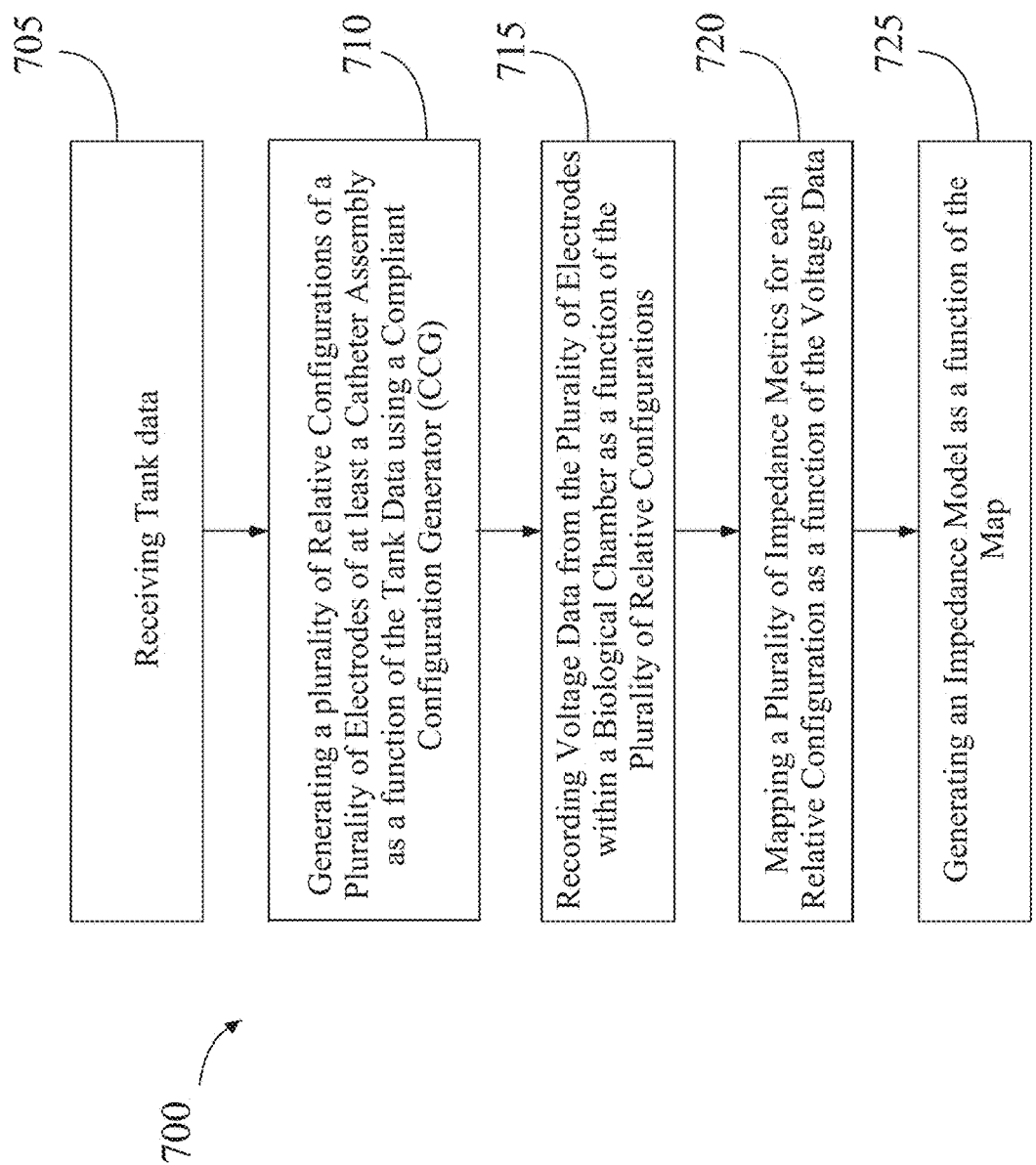
FIG. 7 is a flow diagram of an exemplary method for the generation of an impedance model of a biological chamber.

Referring now to FIG. 7, a flow diagram of an exemplary method 800 for the generation of an impedance model of a biological chamber is illustrated. At step 705, method 800 includes receiving, using at least a processor, tank data. This may be implemented as described and with reference to FIGS. 1-7. In an embodiment, the method may further include generating, using the at least a processor, a plurality of field characterizers as a function of the tank data and the constraint pairs.

Still referring to FIG. 7, at step 710, method 800 includes generating, using the at least a processor, a plurality of relative configurations of a plurality of electrodes of at least a catheter assembly as a function of the tank data using a compliant configuration generator (CCG), wherein the at least a catheter assembly comprises at least a tip formed by a plurality of limbs, wherein each limb of the plurality of limbs comprises the plurality of electrodes arranged into one or more constraint pairs. This may be implemented as described and with reference to FIGS. 1-7.

Still referring to FIG. 7, at step 715, method 800 includes recording, using the at least a processor, voltage data from the plurality of electrodes within a biological chamber as a function of the plurality of relative configurations. This may be implemented as described and with reference to FIGS. 1-7.

Still referring to FIG. 7, at step 715, method 800 includes mapping, using the at least a processor, a plurality of impedance metrics for each relative configuration of the plurality of relative configurations as a function of the voltage data. This may be implemented as described and with reference to FIGS. 1-7.

Still referring to FIG. 7, at step 715, method 800 includes generating, using the at least a processor an impedance model as a function of the map. This may be implemented as described and with reference to FIGS. 1-7.

With continued reference to FIG. 7, In one embodiment of the method, a constraint compliance metric is generated for each relative configuration of a plurality of relative configurations using at least a processor. Optionally, the method may include optimizing this constraint compliance metric for each relative configuration using the processor, and subsequently adjusting the plurality of relative configurations based on the optimized constraint compliance metric. Another embodiment may involve generating a compliant configuration distribution as a function of the plurality of relative configurations, enhancing the adaptability of the device in various clinical settings. In a further embodiment, the plurality of electrodes may be organized in a grid arrangement, which may facilitate more precise measurements and treatment applications. Additionally, the catheter assembly may include an ablation tool, and in this context, the method could involve selecting a target area based on the impedance model and engaging the ablation tool accordingly to precisely target and treat the selected area. In another embodiment, the impedance model that is generated may include a three-dimensional model of the electrical properties of a heart, providing a comprehensive visualization that aids in accurate diagnosis and treatment planning. The actuation of the catheter assembly into a plurality of relative configurations may include training a compliant configuration generator (CCG) using CCG training data, which consists of examples of constraint pairs correlated to outputs of relative configurations, and then using this trained generator to actuate the catheter assembly. Moreover, generating the impedance model may involve using an impedance machine learning model, leveraging advanced computational techniques to enhance the accuracy and reliability of the model. Each of these embodiments provides a foundation for more effective and targeted medical interventions, particularly in complex environments such as cardiac care.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
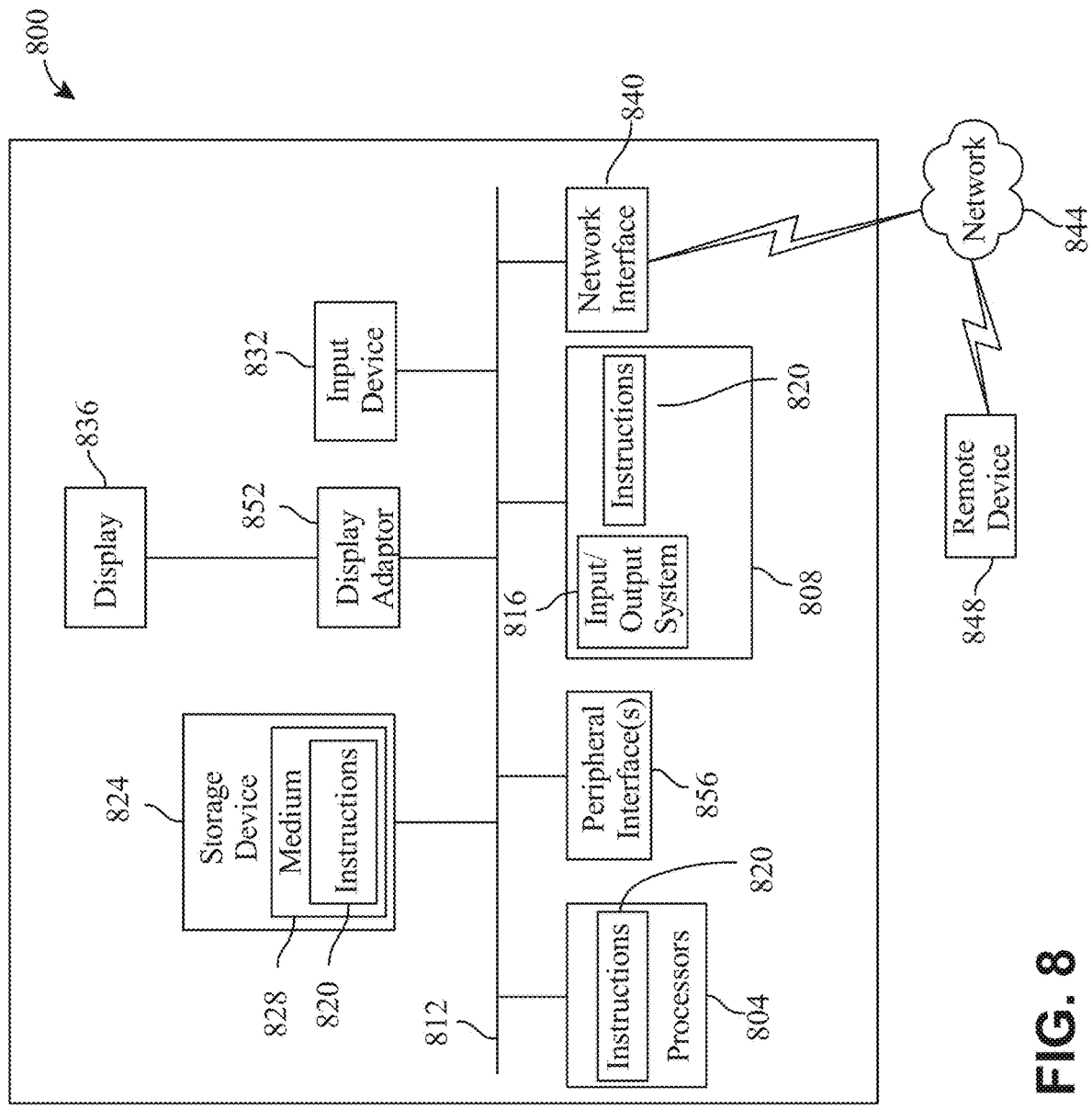
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for the generation of an impedance model of a biological chamber, wherein the apparatus comprises:
   at least a catheter assembly comprising at least a tip formed by a plurality of limbs, wherein each limb of the plurality of limbs comprises a plurality of electrodes arranged into one or more constraint pairs;
   at least a processor communicatively connected to the at least a catheter assembly; and
   a memory communicatively connected to the at least a processor, wherein the memory contains instructions configuring the at least a processor to:
   receive tank data;
   generate a plurality of relative configurations of the plurality of electrodes as a function of the tank data using a compliant configuration generator (CCG);
   record voltage data from the plurality of electrodes within a biological chamber as a function of the plurality of relative configurations;
   map a plurality of impedance metrics for each relative configuration of the plurality of relative configurations as a function of the voltage data; and
   generate an impedance model as a function of the map.

2. The apparatus of claim 1, wherein generating the plurality of relative configurations comprises generating a constraint compliance metric for each relative configuration of the plurality of relative configurations.

3. The apparatus of claim 2, wherein the memory further instructs the processor to:
   optimize the constraint compliance metric for each relative configuration of the plurality of relative configurations; and
   adjust the plurality of relative configurations as a function of the optimized constraint compliance metric.

4. The apparatus of claim 1, wherein the memory further instructs the processor to generate a compliant configuration distribution as a function of the plurality of relative configurations.

5. The apparatus of claim 1, wherein the plurality of electrodes are organized in a grid arrangement.

6. The apparatus of claim 1, wherein the memory further instructs the processor to generate a plurality of field characterizers as a function of the tank data and the constraint pairs.

7. The apparatus of claim 1, wherein:
   the at least a catheter assembly comprises an ablation tool; and
   the memory further instructs the processor to:
   select a target area as a function of the impedance model; and
   engage the ablation tool as a function of the selection of the target area.

8. The apparatus of claim 1, wherein the impedance model comprises a three-dimensional model of the electrical properties of a heart.

9. The apparatus of claim 1, wherein actuating the at least a catheter assembly into a plurality of relative configurations comprises:
- training the compliant configuration generator using CCG training data, wherein CCG training data comprises examples of constraint pairs as inputs correlated to examples of relative configurations as outputs; and
- actuating the at least a catheter assembly into the plurality of relative configurations as a using the trained compliant configuration generator.

10. The apparatus of claim 1, wherein generating the impedance model comprises an impedance machine learning model.

11. A method for the generation of an impedance model of a biological chamber, wherein the method comprises:
- receiving, using at least a processor, tank data;
- generating, using the at least a processor, a plurality of relative configurations of a plurality of electrodes of at least a catheter assembly as a function of the tank data using a compliant configuration generator (CCG), wherein the at least a catheter assembly comprises at least a tip formed by a plurality of limbs, wherein each limb of the plurality of limbs comprises the plurality of electrodes arranged into one or more constraint pairs;
- recording, using the at least a processor, voltage data from the plurality of electrodes within a biological chamber as a function of the plurality of relative configurations;
- mapping, using the at least a processor, a plurality of impedance metrics for each relative configuration of the plurality of relative configurations as a function of the voltage data; and
- generating, using the at least a processor an impedance model as a function of the map.

12. The method of claim 11, wherein method further comprises generating, using the at least a processor, a constraint compliance metric for each relative configuration of the plurality of relative configurations.

13. The method of claim 12, wherein method further comprises:
- optimizing, using the at least a processor, the constraint compliance metric for each relative configuration of the plurality of relative configurations; and
- adjusting, using the at least a processor, the plurality of relative configurations as a function of the optimized constraint compliance metric.

14. The method of claim 11, wherein method further comprises generating, using the at least a processor, a compliant configuration distribution as a function of the plurality of relative configurations.

15. The method of claim 11, wherein the plurality of electrodes are organized in a grid arrangement.

16. The method of claim 11, wherein the method further comprises generating, using the at least a processor, a plurality of field characterizers as a function of the tank data and the constraint pairs.

17. The method of claim 11, wherein:
- the at least a catheter assembly comprises an ablation tool; and
- the method further comprises:
  - selecting, using the at least a processor, a target area as a function of the impedance model; and
  - engaging, using the at least a processor, the ablation tool as a function of the selection of the target area.

18. The method of claim 11, wherein the impedance model comprises a three-dimensional model of the electrical properties of a heart.

19. The method of claim 11, wherein actuating the at least a catheter assembly into a plurality of relative configurations comprises:
- training the compliant configuration generator using CCG training data, wherein CCG training data comprises examples of constraint pairs as inputs correlated to examples of relative configurations as outputs; and
- actuating the at least a catheter assembly into the plurality of relative configurations as a using the trained compliant configuration generator.

20. The method of claim 11, wherein generating the impedance model comprises generating the impedance model using an impedance machine learning model.

* * * * *